US011654409B2

United States Patent
Bertino et al.

(10) Patent No.: US 11,654,409 B2
(45) Date of Patent: May 23, 2023

(54) METHODS FOR FABRICATION OF SILICA AEROGELS WITH CUSTOM SHAPES USING FREEZE DRYING

(71) Applicants: VIRGINIA COMMONWEALTH UNIVERSITY, Richmond, VA (US); QATAR FOUNDATION FOR EDUCATION, SCIENCE AND COMMUNITY DEVELOPMENT, Education (QA)

(72) Inventors: Massimo Bertino, Glen Allen, VA (US); Lauren White, Henrico, VA (US); Dalton Echard, Fairfax, VA (US); Tyler Selden, Richmond, VA (US)

(73) Assignee: Virginia Commonwealth University, Richmond, VA (US)

( * ) Notice: Subject to any disclaimer, the term of this patent is extended or adjusted under 35 U.S.C. 154(b) by 220 days.

(21) Appl. No.: 16/939,769

(22) Filed: Jul. 27, 2020

(65) Prior Publication Data

US 2020/0353437 A1  Nov. 12, 2020

Related U.S. Application Data

(63) Continuation of application No. 16/095,158, filed as application No. PCT/US2017/028903 on Apr. 21, 2017, now abandoned, which is a continuation-in-part of application No. 15/500,376, filed on Jan. 30, 2017, now Pat. No. 10,414,894.

(60) Provisional application No. 62/325,525, filed on Apr. 21, 2016.

(51) Int. Cl.
*B01J 13/00* (2006.01)
*C08J 3/075* (2006.01)
*C01B 33/158* (2006.01)
*C08G 77/388* (2006.01)

(52) U.S. Cl.
CPC ....... *B01J 13/0091* (2013.01); *C01B 33/1585* (2013.01); *C08G 77/388* (2013.01); *C08J 3/075* (2013.01); *C01P 2006/60* (2013.01); *C08J 2205/026* (2013.01); *C08J 2333/02* (2013.01); *C08J 2383/04* (2013.01); *C08J 2383/08* (2013.01)

(58) Field of Classification Search
CPC ............. B01J 13/0091; C01B 33/1585; C08G 77/388; C08J 3/075; C08J 2205/026; C08J 2333/02; C08J 2383/04; C08J 2383/08; C01P 2006/60
See application file for complete search history.

(56) References Cited

U.S. PATENT DOCUMENTS

| | | | | |
|---|---|---|---|---|
| 5,807,607 A | * | 9/1998 | Smith | H01L 21/02216 438/758 |
| 7,618,608 B1 | * | 11/2009 | Keller, Sr. | B01J 13/0091 423/338 |
| 2005/0192366 A1 | * | 9/2005 | Ou | C01B 33/1585 521/64 |

OTHER PUBLICATIONS

"Fabrication of functionally graded aerogels, cellular aerogels and anisotropic ceramics" by Wingfield et al., J. Mater. Chemistry, 2011.*

* cited by examiner

*Primary Examiner* — Irina S Zemel
(74) *Attorney, Agent, or Firm* — Michael E. Whitham

(57) ABSTRACT

A method of synthesizing aerogels and cross-linked aerogels are described that incorporate freeze-drying in lieu of supercritical solvent drying. Advantages over supercritical drying include a reduction in hazard risks posed by drying at supercritical conditions as well as the ability to up-scale the process to accommodate large pieces of material without introducing risk. In addition, inexpensive and more sophisticated mold technologies, which are not impervious to super-critical conditions, can be used to produce aerogel materials according to the freeze-drying method of the invention. This introduces a level of freedom never before available for the production of aerogel components.

19 Claims, 11 Drawing Sheets

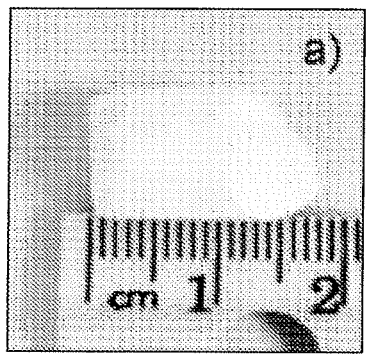
FIG. 1A
FIG. 1B
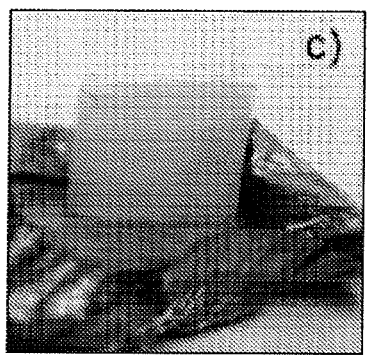
FIG. 1C
FIG. 1D

METHODS FOR FABRICATION OF SILICA AEROGELS WITH CUSTOM SHAPES USING FREEZE DRYING

CROSS-REFERENCE TO RELATED APPLICATIONS

The present application relies on the disclosure of and claims priority to and the benefit of the filing date of U.S. Provisional Application No. 62/325,525, filed Apr. 21, 2016 and is a Continuation-In-Part application of U.S. patent application Ser. No. 15/500,376 filed Jan. 30, 2017, which is a national stage application of International Application No. PCT/US2015/043234, filed Jul. 31, 2015 and published as International Publication No. WO 2016019308 on Feb. 4, 2016, which PCT relies on the disclosure of and claims priority to and the benefit of the filing date of U.S. Provisional Application No. 62/031,211, filed Jul. 31, 2014. The disclosures of each of these applications are hereby incorporated by reference herein in their entireties.

BACKGROUND OF THE INVENTION

Field of the Invention

The present invention relates to the field of aerogel synthetic chemistry and processing. More particularly, the present invention in embodiments relates to fabrication of native and cross-linked aerogels in monolithic form by freeze-drying wet gels.

Description of Related Art

Aerogels are solid materials of extremely low density, produced by removing the liquid component from a conventional wet gel. They are ultra-light, highly porous and highly thermally insulating materials composed of a network of interconnected nanostructures. Their typical density is lower than 0.1 $g/cm^3$, their surface area is in the 700-1000 $m^2/g$ range and their thermal conductivity can be as low as 2.1 mW/mK (see N. Leventis, *Accounts of Chemical Research.*, 2007, 40, 874 ("Leventis, 2007") and A. C. Pierre. G. M. Pajonk, *Chem. Rev.*, 2002, 102, 4243 ("Pierre, 2002")). Because of this unique combination of properties, aerogels are being considered for applications as varied as thermal and sound insulation for the aerospace industry, as absorbents for environmental remediation and as catalyst supports. However, aerogels are also mechanically fragile and their use has been limited to niche applications such as thermal insulation for the Mars Rovers, as collectors of space and comet dust and as Cerenkov detectors (see Leventis, 2007 and Pierre, 2002). By way of background, other efforts in this area include those described by Leventis et al., such as in U.S. Pat. Nos. 7,732,496 and 8,227,363 as well as in U.S. Patent Application No. 2011/0250428 A1, hereby incorporated by reference in their entireties.

Aerogels are fabricated starting from wet gels. Wet gels are porous materials with the same porosity and surface area of aerogels. However, the pores of wet gels are filled with solvent and precursors used for the synthesis. Typically, the solvent is some alcohol (e.g., methanol, ethanol, or propanol) and some water is added to catalyze the synthetic reaction. The solvent typically cannot be evaporated without cracking the gel because of capillary forces. That is, the solvent adheres strongly to the pore walls and induces cracks and pore collapse when it evaporates. To prevent cracking, a fluid with a low (ideally zero) surface tension is employed, which minimizes the capillary forces. This solvent is typically a supercritical solvent. Supercritical solvent drying has been described in detail in the inventors' previous work (see international Patent Application Publication No. WO 2016019308, which is hereby incorporated by reference in its entirety). While this previous method was a significant step forward in one-step processing of aerogel materials, supercritical solvent drying becomes increasingly hazardous when up-scaled and limits the variety of mold technologies viable for production of materials with custom shapes since most mold materials are affected by supercritical conditions and/or supercritical solvents. Given these limitations, there is a need in the art for improved processes for producing aerogels.

SUMMARY OF THE INVENTION

Embodiments of the present invention provide methods for the production of both native silica and cross-linked aerogel monoliths that incorporate freeze-drying in lieu of supercritical solvent drying. According to embodiments of the methods of the invention, the solvent within the wet gel is frozen. The gel monolith is then placed in a vacuum chamber where the solvent is removed by sublimation. Advantages over supercritical drying, only some of which are discussed herein, include a reduction in hazard risks posed by drying at supercritical conditions as well as the ability to up-scale the process to accommodate large pieces of material without introducing risk. A second advantage of the invention is a substantial reduction in capital expenditures. Autoclaves used for supercritical drying require thick walls and pose liability issues because of the high pressures (on the order of 70 atmospheres) used in supercritical drying. Freeze drying uses vacuum chamber(s) instead which are much cheaper to produce and pose minimal liability issues. Typically, a supercritical drying autoclave costs 10 times more than a freeze drying vacuum chamber of the same capacity. In addition, inexpensive and more sophisticated mold technologies, which are not impervious to supercritical conditions, can be used to produce aerogel materials according to the freeze-drying method of the invention. This introduces a level of freedom never before available for the production of aerogel components.

According to one embodiment, the present invention provides a method for producing an aerogel which includes providing a first solution comprising an alkoxide, providing a second solution comprising a catalyst, mixing the first and second solutions to provide a gelation mixture or composition, and optionally pouring the solutions into a mold. The mixing of the first and second solutions results in formation of a wet gel as a result of hydrolysis of the alkoxide and polymerization of the hydrolyzed alkoxide. After gelation, the wet gel is dried to form an aerogel. According to embodiments, the gel is dried by freeze-drying.

According to another embodiment, the present invention provides a method for producing an aerogel which includes mixing a first solution comprising an alkoxide, a photoinitiator, and a first acrylic monomer and a second solution comprising a catalyst and a second acrylic monomer and optionally pouring the solutions into a mold. The mixing step results in the formation of a wet gel as a result of hydrolysis of the alkoxide and polymerization of the hydrolyzed alkoxide. The method further includes exposing the wet gel to a source of visible light with sufficient intensity to catalyze cross-linking of the wet gel, and drying the wet gel. According to embodiments, the gel is dried by freeze drying.

According to another embodiment, the present invention provides a method for producing an aerogel which includes mixing an alkoxide and a catalyst together in an aqueous solution to provide a composition and optionally pouring the composition into a mold. The mixing of alkoxide and catalyst together results in formation of a wet gel as a result of hydrolysis of the alkoxide and polymerization of the hydrolyzed alkoxide. After gelation, the method further includes performing a solvent exchange step to remove water from the wet gel, and freeze-drying the wet gel to remove solvent from the wet gel to form an aerogel.

According to another embodiment, the present invention provides a method for producing an aerogel which includes mixing an alkoxide, a catalyst, an acrylic monomer, a silica derivatizer and a polymerization initiator together to provide a composition, and optionally pouring the composition into a mold. The mixing step results in the formation of a wet gel as a result of hydrolysis of the alkoxide and polymerization of the hydrolyzed alkoxide. The method further includes exposing the wet gel to a stimulus with sufficient intensity to catalyze cross-linking of the wet gel by the polymerization initiator, and freeze-drying the cross-linked wet gel to form an aerogel.

According to another embodiment, the present invention provides methods of improving the transparency of aerogels through mechanisms such as altering pore size and pore size distribution, changing the size and/or shape of skeletal aggregates, or removing light-scattering reagents.

These embodiments and additional embodiments of the invention and their details will be provided in the foregoing Detailed Description.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

FIG. 1A is a photograph showing a side view of a cross-linked silica aerogel fabricated by freeze drying.

FIG. 1B is a photograph showing a top view of an aerogel fabricated by freeze drying, where gelation byproducts such as methanol were partially removed by evaporation prior to freezing and where the dried monolith is illuminated from below to show improved optical characteristics.

FIG. 1C is an image showing an aerogel sample fabricated as in FIG. 1A, after heating to 400° C., showing that removal of the cross-linking polymer improves transparency.

FIG. 1D is an image of a native aerogel patterned with a polymer honeycomb and compressed uniaxially, where areas between the polymer honeycomb have become transparent and where all samples were reinforced by acrylic polymers which yield opaque aerogels.

FIG. 6B shows a Globular skeletal morphology. The conformal coating fills the gaps between the particles and gives rise to a large aggregate.

FIG. 8C shows flexible aerogel fabricated by the inventors by freeze drying using the precursor formulation reported in Kanamori et al.

FIG. 10A shows a transparent sample with a thickness of 6 mm, while FIG. 10B shows a translucent 3 mm disk prepared without an oven aging step.

DETAILED DESCRIPTION OF VARIOUS EMBODIMENTS OF THE INVENTION

Figure 2A:
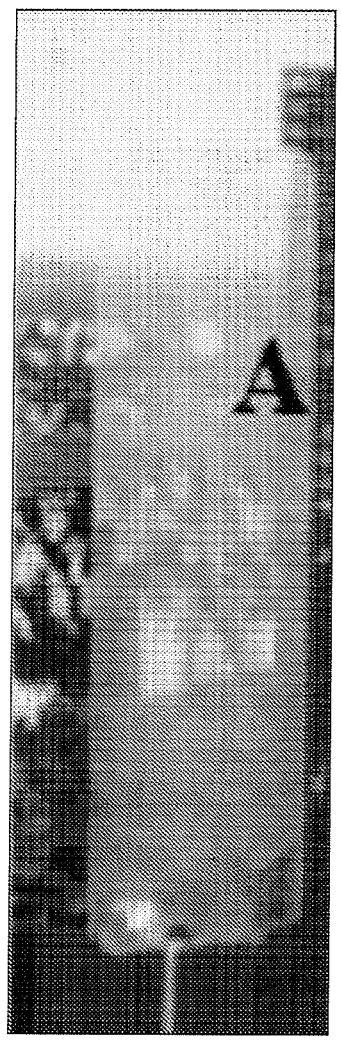
FIGS. 2A and 2B are images of exemplary comparison aerogels prepared by way of supercritical drying, with FIG. 2A showing a silica aerogel cylinder (0.25 inch diameter. UCS=4 MPa) and FIG. 2B showing an aerogel crosslinked with polyurethane in disk form (0.25 inch thick, UCS=186 MPa).

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

In embodiments, the present invention provides a method of fabrication of native and cross-linked silica aerogels in monolithic form by freeze-drying. The silica aerogels may be fabricated into a variety of custom shapes. The custom aerogel shapes may be used in a variety of thermal insulation applications or as window panes.

According to embodiments, the processes used for native and cross-linked aerogels differ in one main aspect. For native silica aerogels, the synthesis is carried out using mostly water as the solvent for gelation. This water must be removed by solvent exchange. For cross-linked aerogels, the inventors prepared a composition (which may also be referred to as a gelation solution, gelation mixture, a mixture, or a solution) with a very limited amount of solvent, e.g., water (about 4% by volume of solvent). This small amount of water was sufficient to induce gelation, but it did not induce cracks into freeze dried monoliths. For this technique, the wet gel is freeze dried starting from the parent solution. That is, there is a single synthetic step and no solvent exchanges are necessary, although if desired solvent exchange(s) can be performed. The key to the success of this method, used for the synthesis of cross-linked aerogels, is that the silica backbone is cross-linked with a conformal polymer coating which lends the rigid backbone some flexibility during freezing of the solvent.

According to embodiments (as detailed in the foregoing Example), freeze-dried native silica aerogels have been obtained with a surface area of ~400 m$^2$/g. Using the inventors' one-pot freeze-drying technique, cross-linked silica aerogels have been obtained with a surface area of ~100 m$^2$/g and a modulus of 50 MPa. All these values are in line with those of native and cross-linked aerogels fabricated by supercritical drying.

The aerogels may be produced in molds having a variety of shapes suitable for thermal insulation and/or window applications, or may be produced without using a mold. As the aerogels may be manufactured as monoliths with a volume of up to 100 cm$^3$, the gels may be cast into a variety of shapes suitable for a variety of applications.

Fabrication of Native Silica Aerogels

According to embodiments, native silica aerogels can be fabricated by derivatizing their surface with an organic moiety. This moiety makes the skeletal oxide structure flexible and able to withstand considerable stresses (see K. Kanamori, M. Aizawa, K. Nakanishi, T. Hanada, J. Sol-Gel Sci. Techn., 2008, 28, 172). In embodiments, surfactants are also added to the gelation solution. These surfactants help control pore size distribution which, in turn, helps reducing freezing stresses (see G. W. Scherer, "Freezing gels", *Journal of Non-Crystalline Solids* 155 (1993) 1-25).

In embodiments, a method for producing a native aerogel is provided, the method comprising: (a) providing a first solution comprising an alkoxide; (b) providing a second solution comprising a catalyst; (c) mixing the first and second solutions to provide a gelation mixture; (d) optionally pouring the solutions (or gelation mixture) into a mold; wherein the mixing of the first and second solutions results in formation of a wet gel as a result of hydrolysis of the alkoxide and polymerization of the hydrolyzed alkoxide; and (e) after gelation, freeze-drying the wet gel to form an aerogel. Further, after gelation and before freeze-drying, solvent exchange may be applied to the gel to remove excess water. Also, embodiments may include addition of a surfactant to the first solution or the second solution or the gelation mixture.

In embodiments of the method, porous matrices are synthesized through a modification of hydrolysis condensation of alkoxides in which addition of water is reduced, or minimized. The reaction occurs in an organic solvent and water with a concentration of water of approximately 4.4% v/v or lower, such as an ethanol-water azeotrope mixture (as used in this specification, references to "ethanol" are intended to mean an ethanol-water azeotrope mixture); the water in the azeotrope slowly hydrolyzes the alkoxide. Lower water concentrations can also be employed but they usually increase gelation time. In embodiments, water can be present in the gelation solution in an amount ranging from about 0.05% v/v to about 5% v/v, such as from 0.1% v/v to 4% v/v, or from about 0.2% v/v to 3% v/v, or from 0.3% v/v to 2% v/v, or from 0.4% v/v to 1.5% v/v, or from about 0.5% v/v to 1% v/v, or from about 0.6% v/v to 0.8% v/v. Water can also be provided by adding to the gelation solution hydrated metal salts. Instead of water, a compound that reacts with the alkoxide or dissociates at high temperature and liberates water could be used, such as formic acid. In embodiments, any mixture of water and an organic solvent can be used. For example, a mixture of acetone and water, or alcohol and water, or methanol and water, or butanol and water, or propanol and water can be used. Additionally, after gelation, the porous matrix (or aerogel) is freeze dried. Suitable freeze-drying techniques are found in the art, including for example as disclosed by German Patent Application Publication No. DE10233703 A1 and corresponding German Patent No. DE10233703 B4.

For example, in one embodiment of the method, porous matrices are synthesized by hydrolyzing an alkoxide without adding any water beyond that present in the ethanol-water azeotrope. First tetramethyl orthosilicate (TMOS) or polyethoxydisiloxane (PEDS) is dissolved into ethanol. Separately, a second solution is prepared which contains ethanol and an amine such as triethanolamine. The two solutions are then mixed and poured into a mold and a gel forms typically within about an hour. The gel is then removed from the mold and freeze dried to yield a porous material (aerogel). Alternatively, the gel can be freeze dried in the mold. The ethanol used in the procedure may be an ethanol-water mixture which contains no more than 4-5% water by volume. Additionally, a base or acid is added during the hydrolysis step as a catalyst. Additional processing steps include a curing step performed overnight.

In embodiments, the first and second solutions are combined to provide a gelation mixture or composition and the alkoxide is present in an amount ranging from about 0.1% v/v to 50% v/v based on total volume of the composition, and/or the composition comprises an amine present in an amount ranging from about 0.1% v/v to 20% v/v based on total volume of the gelation mixture, and/or the composition comprises an organic solvent present in an amount ranging from about 20% v/v to 90% v/v based on total volume of the gelation mixture. In embodiments, the organic solvent can be present in these concentrations and can be chosen from one or more of an alcohol or a ketone, such as one or more of ethanol, methanol, butanol, propanol, acetone, or dimethylsulfoxide.

In one particular embodiment (described in detail in Example 1 below), water is used as a solvent in the composition in lieu of any organic solvent. For example, in one embodiment, native silica aerogels are prepared by combining urea, cetyl trimethylammonium bromide (CTAB), and Acetic Acid with water as the solvent and thoroughly mixing these reagents. Methyltrimethoxysilane is added to the solution to form a gelation composition or mixture and continually stirred for 30 minutes. This composition is then poured into a mold and placed in an oven at 60° C. for 36 hours to allow for gelation and aging. Water is removed through solvent exchange with an organic solvent to prepare for the freeze-drying step. Once solvent exchange is completed so the water concentration is less than 5% of the volume solvent, the monoliths are frozen and then dried.

The gelation mixture or composition may comprise a ratio of alkoxide to solvent (whether it is water, organic solvent, or a mixture of water and organic solvent) at about 1:99 to 99:1, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, or any range within these ratio ranges. The gelation mixture may comprise a ratio of catalyst to solvent at about 1:99 to 99:1, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, or any range within these ratio ranges. Likewise, the ratio of catalyst to alkoxide may be around 1:99 to 99:1, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, 1:2, 2:1, 1:3, 3:1, 1:4, 4:1, 1:5. 5:1, 1:6, 6:1, 1:10 or 10:1 and so on, or any range within these ratio ranges. Such ratios may be determined by weight or by volume.

Fabrication of Cross-Linked Aerogels

In other embodiments, the present invention provides a method of synthesizing cross-linked aerogels in a single step and in a single pot without requiring any solvent exchange. In addition, embodiments of the invention allow for fabrication of custom aerogel parts with large dimensions, as well as high volume fabrication of aerogels. The custom aerogel parts may be used in a variety of thermal insulation applications.

According to embodiments, cross-linked silica aerogels (mechanically strong aerogels) are prepared. Their mechanical strength arises by cross-linking the skeletal oxide particles with a polymer (see U.S. Pat. Nos. 8,277,676 and 8,227,363). The strength of these materials allows them to withstand the freezing stresses. These gels may be fabricated using the inventors' previously reported methods (see International Patent Application Publication No. WO 2016019308) with or without any additional modifications.

In embodiments, a method for producing a cross-linked aerogel is provided, comprising a) mixing a first solution comprising an alkoxide with a second solution comprising a catalyst, an acrylic monomer, a silica derivatizer and a polymerization initiator and optionally pouring the solutions into a mold, wherein such mixing step results in the formation of a wet gel as a result of hydrolysis of the alkoxide and polymerization of the hydrolyzed alkoxide, b) exposing the wet gel to a stimulus with sufficient intensity to catalyze cross-linking of the wet gel by the polymerization initiator, and c) freeze-drying the cross-linked wet gel to form an aerogel.

In particular, the present invention in embodiments provides a method in which a porous monolith is synthesized, made mechanically robust by polymer cross-linking and dried by freeze-drying into an aerogel, without requiring any intermediate processing steps and/or solvent exchange.

Another specific embodiment of the method provides for the synthesis of aerogel composites. A first solution is prepared by adding an alkoxide carrying a polymerizable moiety (such as vinyltrimethoxysilane (VMOS)) to a solution of ethanol and TMOS. A second solution is prepared separately which contains ethanol, triethanolamine, a polymerization initiator and a monomer such as methylacrylate. The solutions are then mixed and a gel is synthesized by mixing the two solutions. The gel is then dried by freeze-drying. In alternative embodiments, the gel may be polymerized before the drying step through thermal initiation or photopolymerization.

According to an exemplary embodiment, cross-linked aerogels are fabricated by combining an alkoxide carrying a polymerizable moiety, e.g. vinyltrimethoxysilane (VMOS) or tetramethylorthosilane (TMOS), added to a primary, secondary or tertiary alcohol. A second solution is prepared separately which includes the same or another alcohol, a catalyst such as triethanolamine, a monomer such as methylmethacrylate, a silica derivatized such as trimethoxysilylpropyl methacrylate and a polymerization initiator. If dry solvents are employed, water can be added to reach a concentration of no more than 4-5% by volume of the solvent. The two solutions are then mixed and poured into a mold. Gelation occurs within one hour. Next, polymerization is initiated thermally if a thermal initiator is employed, or by photopolymerization when a photoinitiator is used. After polymerization, the monoliths are freeze dried.

In embodiments, the first solution may comprise a ratio of alkoxide to alcohol at about 1:99 to 99:1, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, or any range within these ratio ranges. The second solution may comprise a ratio of catalyst to alcohol at about 1:99 to 99:1, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, or any range within these ratio ranges. The second solution may comprise a ratio of monomer to alcohol of 1:99 to 99:1, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, or any range within these ratio ranges. Likewise, the ratio of catalyst to alkoxide may be around 1:99 to 99:1, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, 1:2, 2:1, 1:3, 3:1, 1:4, 4:1, 1:5, 5:1, 1:6, 6:1, 1:10 or 10:1 and so on, or any range within these ratio ranges. Such ratios may be determined by weight or by volume.

Freeze-Drying

In embodiments, the native silica and cross-linked aerogel monoliths can be frozen by any freezing technique known in the art. If the gels are kept inside the original molds, freezing can be carried out by placing the gels into liquid nitrogen, into a cryogenic mixture (e.g., dry-ice acetone bath), or inside a refrigerator. Any freezing method works, provided that the gels are brought to a temperature below the freezing temperature of the solvent used for the synthesis or solvent exchange. Use of tert-butanol as a solvent appears to be especially advantageous, since this solvent freezes just about at room temperature and therefore it does not require to be cooled to low temperatures (a household freezer is sufficient). However, any solvent with a low freezing temperature may work, such as for example ethanol, 1-butanol, dimethyl sulfoxide, and carbon tetrachloride. The frozen gel is then dried using a conventional freeze dryer or, more simply, placed in a vacuum chamber which is pumped by a conventional rotary pump. The part of the chamber hosting the sample must be kept at temperatures on the order of the freezing temperature of the solvent.

Improved Transparency

Additional embodiments include any method of increasing the transparency of an aerogel. The methods may increase transparency through any mechanism, such as altering pore size and pore size distribution, changing the size and/or shape of skeletal aggregates, removing substances such as water or other reagents, and the like. In embodiments, these methods may include but not be limited to the use of heat treatments, uniaxial compression, the use of polyurethane monomers for cross-linking instead of acrylic monomers, the use of organosilanes, the use of surfactants and drying control chemical additives, or adjusting the reaction conditions such as increasing the temperature during polymerization, increasing the amount of catalyst, reducing the concentration of monomer, or using poly/functional monomers. Such methods are described in more detail in Example 2 below. Embodiments of the invention also include aerogels with improved transparency as measured by the level of light transmission through a sample of the aerogel.

Reagents

In any embodiment of the invention, the surfactants may include quaternary ammonium salts such as cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB), and the like. However, in other embodiments other surfactants can be used, including anionic surfactants (e.g. sulfates, sulfonates, phosphates, and carboxylates), zwitterionic surfactants (e.g. betaines), non-ionic surfactants (e.g. polyethylene glycol, polypropylene glycol), and the like.

In any embodiment of the invention, the alkoxide may be a silicon alkoxide such as the organo-orthosilicates tetraethyl orthosilicate (TEOS), tetramethyl orthosilicate (TMOS). polyethoxydisiloxane (PEDS), methyltrimethoxysilane (MTMS), or vinyltrimethoxysilane (VMOS). Alkoxides of other transition metals, as well as chlorides, nitrates or acetylacetonates can also be employed. In embodiments, for example, sodium silicate and/or aluminum chloride could be used in particular. Although silica may be used, any metal oxide and sulfide can also or alternatively be used.

In any embodiment of the invention, the gelation reaction may be catalyzed by an acid (such as a metal salt) or base (such as an amine) or a catalyst containing fluoride. To minimize the amount of water added to the solution, a metal salt may be added as an acid catalyst. In one embodiment, aluminum chloride is used. In other embodiments, salts containing other acidic ions including $Cr^{3+}$, $Fe^{3+}Bi^{3+}$, $Be^{2+}$, $NH_4^+$ are used. In other embodiments, acids such as hydrochloric acid, sulfuric acid, and nitric acid are used. Base catalysts may include amines such as triethanolamine, diethanolmethylamine, dimethylethlyamine, or dimethanolmethylamine or hydroxides such as ammonium hydroxide. Other embodiments may use ammonium fluoride.

Additionally, embodiments may employ an acrylate or acrylated monomer for the synthesis of cross-linked aerogels, and the cross-linking reaction may be catalyzed by photopolymerization or thermal polymerization. Examples of acrylated monomers include HDDA (hexanediol diacrylate) and acrylated DPHA (dipentaerythritol hexaacrylate). Other non-limiting examples of acrylates include methyl acrylate, ethyl acrylate, 2-chloroethyl vinyl ether, 2-ethylhexyl acrylate, hydroxyethyl methacrylate, butyl acrylate, and butyl methacrylate.

Photopolymerization of cross-linked aerogels may be initiated by including a photoinitiator in one of the precursor solutions. Examples of photoinitiators include Eosin Y, Nile Red, Alizarine Red S, and Rhodamine B. Other examples of photoinitiators are known (see Fouassier et al, Dyes as Photoinitiators or Photosensitizers of Polymerization Reactions, *Materials* 2010, 3, 5130-5142). Polymerization can be also induced thermally or by using thermal initiators.

Exemplary alcohols for use in the gelation precursor solutions or mixtures or in solvent exchange may include methanol, ethanol, butanol, tert-butanol, isopropyl alcohol, isobutanol, benzyl alcohol, and the like, including any one or more solvent having a low entropy of fusion, such as cyclohexane or tert-butanol (t-butanol). The alcohols may be any primary, secondary, or tertiary alcohol capable of freeze-drying. Additional solvents may be ketones, such as acetone, or acetonitrile, or mixtures of alcohols and these solvents.

The following Examples will describe the above exemplary embodiments in more detail. However, it should not be used to limit the scope of the invention.

By way of background to the Examples, freeze-drying of wet gel has been previously reported by other groups (see L. F. Su, L. Miao, S. Tanemura, G. Xu, *Sci. Technol. Adv. Mat.* 2012, 13, 035003; A. Pons, L. Casas, E. Estop, E. Molins, K. D. M. Harris, M. Xu, *J. Non-Cryst. Solids,* 2012, 358, 461; S. R. Mukai, H. Nishihara, H. Tamon, *Micropor. Mesopor. Mat.,* 2003, 63, 43; and E. Degn Egeberg, J. Engell, *Journal de Physique Colloques,* 1989, 50 (C4), p.C4-23-C4-28). However, it has only been confirmed as a process capable of yielding powders and not monoliths. This is for two reasons: Freezing must be rapid; otherwise large solvent crystals may grow inside the pores and induce cracks. Most importantly, considerable amounts of water (up to 10% by volume) are commonly employed in the synthesis of wet gels. Water expands when frozen and leads to a fractured silica backbone. For this reason, freeze-drying is generally considered a viable method only for the production of aerogel powders.

For example, in one previous work, gels were synthesized directly using tert-butanol as a solvent (see L. F. Su, L. Miao, S. Tanemura, G. Xu, *Sci. Technol. Adv. Mat.* 2012, 13, 035003). However, cracked gels were reported, presumably because a large amount of water was employed in the synthesis. In other work (see A. Pons, L. Casas, E. Estop, E. Molins, K. D. M. Harris, M. Xu. *J. Non-Cryst. Solids.* 2012, 358, 461; E. Degn Egeberg, J. Engell, *Journal de Physique Colloques,* 1989, 50 (C4), p.C4-23-C4-28), the gelation solvent was exchanged with tert-butanol prior to freezing. Tert-butanol has several advantages over water, the most relevant being lack of expansion upon freezing. In both cases, large fragments and monoliths with a size of a few millimeters were reported. However, both works lamented the extreme fragility of the materials. This was also the inventors' experience. If native silica gels (prepared by hydrolysis-condensation of, say, trimethylorthosilicate) were employed, aerogels in monolithic form could be obtained. However, these aerogels were extremely fragile and turned into dust even with careful and slight manipulation. To reduce cracking of the monoliths during freeze-drying, the inventors produced wet gels with flexible reinforced silica skeletons. The modified backbone withstands the freezing stresses. The result was native and cross-linked aerogels in monolithic form. Disk-shaped samples with a diameter of up to 4 cm have been produced, having been limited by the maximum size allowed by the particular vacuum chambers used. The materials can be handled with the same precautions used for handling native silica aerogels. If mechanically solicited, they may crack, but they do not turn into dust.

EXAMPLE 1

Native silica. Wet gels were prepared following a published method (see K. Kanamori, M. Aizawa, K. Nakanishi, T. Hanada, *J. Sol-Gel Sci. Techn.,* 2008, 28, 172). For this, 0.88 g of urea, 0.1167 g of cetyl trimethylammonium bromide (CTAB), 0.019 ml of Acetic Acid and 2.842 ml of water as the solvent are thoroughly mixed. 1.672 ml of methyltrimethoxysilane is added to the solution and continually stirred for 30 minutes. This mixture is then poured into a mold and placed in an oven at 60° C. for 36 hours to allow for gelation and aging. Wet gels synthesized in this way are not suitable for freeze-drying. They contain a large amount of water, which expands during freezing and cracks the gels. Starting from this point, the inventors' procedure differs from the published one (see K. Kanamori, M. Aizawa, K. Nakanishi, T. Hanada, *J. Sol-Gel Sci. Techn.,* 2008. 28, 172). Water is removed through solvent exchange with an organic solvent to prepare for the freeze-drying step. Once solvent exchange is completed so the water concentration is less than 5% of the volume solvent, the monoliths are frozen. If the gels are kept inside the original molds, freezing can be carried out by placing the gels into liquid nitrogen, into a cryogenic mixture (e.g., dry-ice acetone bath), or inside a refrigerator. Any freezing method works, provided that the gels are brought to a temperature below the freezing temperature of the solvent used for the synthesis. Use of tert-butanol as a solvent appears to be especially advantageous, since this solvent freezes just about at room temperature and therefore it does not require to be cooled to low temperatures (a household freezer is sufficient). The frozen gel is then dried using a conventional freeze dryer or, more simply, placed in a vacuum chamber which is pumped by a conventional rotary pump. The part of the chamber hosting the sample must be kept at temperatures on the order of the freezing temperature of the solvent. This fabrication method yields a porous material (aerogel) with a density of about 0.2 g/cm$^3$ and a surface area of up to 450 m$^2$/g.

Cross-linked aerogels are fabricated as follows, 0.5 ml of an alkoxide carrying a polymerizable moiety (see N. Leventis, C. Sotiriou-Leventis, G. Zhang, A.-M. M. Rawashdeh, *Nano Lett.,* 2002, 2, 957; C. Wingfield, A. Baski, M. F. Bertino, N. Leventis, D. P. Mohite, H. Lu. *Chem. Mater.,* 2009, 21, 2108; and C. Wingfield, L. Franzel, M. P. Berlino, Leventis, *J. Mater. Chem.* 2011, 21, 11737). e.g. vinyltrimethoxysilane (VMOS) or tetramethylorthosilane (TMOS), is added to a solution of 0.5 ml of an alcohol such as ethanol, butanol or tert-butanol or other primary, secondary or tertiary alcohol. A second solution is prepared separately which consists of 1.0 ml of the same or another alcohol, 40 μl of triethanolamine, between 0.2 and 1.5 ml of a monomer such as methylmethacrylate, between 0.05 and 0.3 ml of a silica derivatizer such as trimethoxysilylpropyl methacrylate and a polymerization initiator. If dry solvents are employed, water is added to reach a concentration of no more than 4% by volume of the solvent. The two solutions are then mixed and poured into a mold. Gelation occurs within one hour. Next, polymerization is initiated thermally if a thermal initiator is employed, or by photopolymerization when a photoinitiator is used. Polymerization engages the organic moiety on the pore surfaces and cross-links the oxide particles making up the skeleton of the gel. It differs from the inventors' previous work only for the drying method. After polymerization, the monoliths are frozen following the procedure reported for native silica aerogels. This fabrication method yields a porous material (aerogel) with a density of about 0.25 g/cm$^3$ and a surface area of ~100 m$^2$/g and a modulus of 50 MPa. This same chemistry was used in the inventors' previous disclosure (see International Patent Application Publication No. WO 2016019308). One difference being that gels are now freeze-dried and not supercritically-dried.

Custom shapes. The aerogels can be cast into molds of any arbitrary shape. Molds and aerogels can be placed into a freeze dryer. After drying, the aerogels can be removed from the molds to yield aerogel components with custom shape. Fabrication of aerogels with custom shapes was reported in the inventors' original patent application and published recently (see International Patent Application Publication No. WO 2016019308 and L. S. White, D. R. Echard, M. F. Bertino, X. Gao, S. Donthula, N. Leventis, N. Shukla, J. Kośny, S. Saeed and K. Saoud, *Transl. Mater. Res.* 3 (2016)). This work differs from the previous one because it allows use of any molding material. Because of the high temperatures, supercritical solvent drying does not allow plastic molds, and certain metal molds can react with the hot solvents. Freeze-drying is a much more benign approach which has virtually no limitations on the type of molds.

EXAMPLE 2

FIGS. 1A-1D show results of methods employed according to this disclosure. Aerogel monoliths can be produced by freeze drying (FIG. 1A), and transparency of the monoliths can be improved by refinement of the synthesis procedure (FIG. 1B), by heat treatment (FIG. 1C) and/or by uniaxial compression (FIG. 1D).

Fabricating aerogel monoliths with sizes suitable for standardized thermal and mechanical testing (most common thermal test for insulation is ASTM C518), requires boards with a minimum size of 15 cm×15 cm×2.5 cm. In particular, a dryer for processes such size samples should be used. Another consideration is avoiding or preventing cracking of the monoliths during freeze drying.

Cracking occurs because solvent freezing induces considerable stresses on the solid skeleton of porous materials. The stresses are caused by growth of large crystals inside pores and solvent diffusion between pores. Because of the larger surface-to-volume ratio, the solvent in small pores freezes at a lower temperature than the solvent in large pores. These different freezing temperatures cause diffusion of solvent from the small to the large pores during freezing (see *Journal of non-crystalline solids* 155, 1-25 (1993)). Solvent diffusion also supports growth of crystals inside the larger pores. These crystals tend to grow even after they become as large as the pores and induce cracking. Solvent depletion generates also capillary stresses and cracking inside the small pores. Thus, mechanical reinforcement may be necessary to fabricate some monoliths.

Figure 2B:
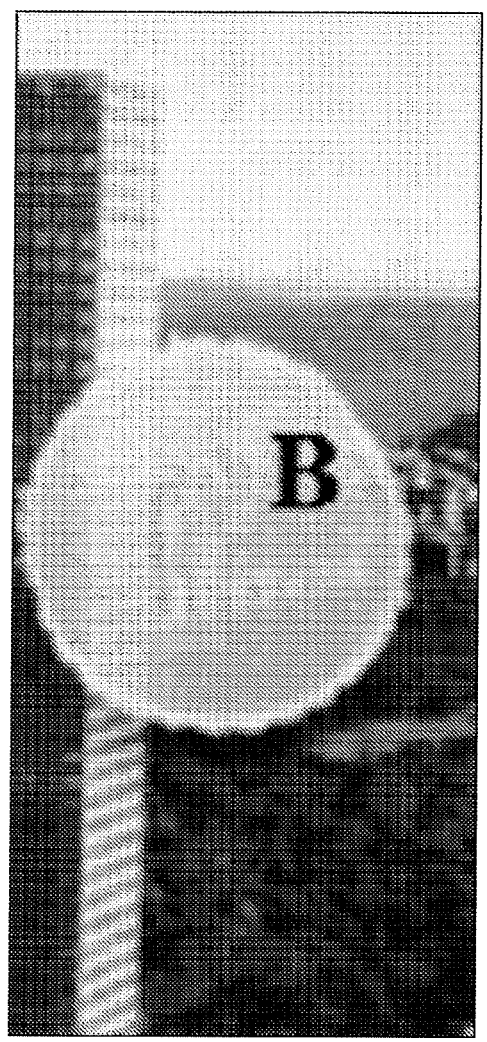

Reinforcement can be provided by polymer cross-linking, by increasing the density of the gels (i.e., using an excess of silica precursor) or by adding fibers to the gelation solution (see *Journal of Non-Crystalline Solids* 385 55-74 (2014)). All of these strategies are straightforward to implement and yield materials which are at least one order of magnitude stronger than native aerogels. The critical size (i.e., the largest size that can be dried without fragmentation) depends on the bulk modulus of the material. Aerogels produced in the past by freeze drying (see K. Kanamori, M. Aizawa, K. Nakanishi, T. Hanada, "Elastic organic-inorganic hybrid aerogels and xerogels", *J Sol-Gel Sci Technol* (2008) 48, 172-181) had a modulus of about 1 MPa and a critical size of 3-5 mm. Reinforced aerogels have a modulus of up to 100 times the modulus of native aerogels (see *Nano Lett.* 2, 957-960 (2002)). A critical size of between 30 and 50 cm is desirable. Additionally, some reinforcement techniques yield transparent materials. FIGS. 2A and 2B compares native and aerogels cross-linked with polyurethane, dried supercritically. Polyurethane cross-linking yields smaller secondary particles than acrylic cross-linking (used in FIGS. 1A-1D), and, consequently, more transparent materials.

Strategies for reducing freezing stresses can also be used, which would eliminate or alleviate the need for reinforcement. One such strategy is to use solvents with a low entropy of fusion such as cyclohexane or tert-butanol (t-butanol). T-butanol was employed for the fabrication of the sample in FIG. 1A. However, it contained water and methanol as synthesis byproducts. These solvents are detrimental to freeze drying. Removal of these solvents by evaporation prior to gelation or by solvent exchange after gelation yields aerogels with improved transparency (FIG. 1B). Drying stresses can be further reduced by synthesizing gels with a narrow pore size distribution. Pore size distributions can be controlled by adding to the gelation solution an amphiphilic surfactant (see *Micropor. and Mesopor. Mater.* 158, 247-252 (2012)) or a polar molecule that binds to silanol groups such as dimethylformamide (see *Microporous Materials* 12, 63-69 (1997)). Narrow pore size distributions typically greatly aid freeze drying. The solvent in the pores will freeze at the same temperature, solvent diffusion will be minimized and so the stresses.

Achieving higher transparency is also desired for some applications and uses. As shown in FIGS. 2A and 2B, transparent, mechanically strong materials can be produced by a careful selection of the cross-linking polymer using supercritical drying. The transparency of the materials in FIGS. 2A and 2B can be increased by reducing the concentration of the crosslinker and by controlling pore size distribution (see *Micropor. and Mesopor. Mater.* 158, 247-252 (2012); see *Microporous Materials* 12, 63-69 (1997)). Achieving a sufficient transparency would eliminate the need for densification and sandwiching, since the composites are mechanically strong. Transparency can also be improved by heating and/or by uniaxial compression. Both strategies reduce the mean pore size, which is the main source of light scattering (see *Microporous Materials* 12, 63-69 (1997)). In the case of cross-linked materials, heating also removes the polymer and improves transparency, as shown in FIG. 1C. In embodiments, uniaxial compression is an alternative to heating to attain transparency (see *Journal of Sol-Gel Science and Technology* 14, 249-256 (1999)). In FIG. 1D the inventors show a monolith that had been reinforced with a honeycomb polymer pattern (as part of another project) and compressed to about 50% of the original thickness. Increasing density ($\rho$) has advantages and disadvantages. It increases the mechanical strength, which has a $\rho^{3.1}$ dependence, but also the thermal conductivity, which has a $\rho^{1.5}$ dependence. Preferred densification strategies are targeted to achieve transparent materials with $\rho$~0.15-0.17 g/cm$^3$. Aerogels in this density range have been shown to exhibit excellent transparency when heated at 800° C. (see *Microporous Materials* 12, 63-69 (1997)). Assuming the starting aerogel having $\rho$~0.1 g/cm$^3$, minimum modulus of 1 MPa, and thermal conductivity of ~15 mW/m-K, and using the above power relationships, the resulting densified aerogel is expected to have a minimum modulus of 6-8 MPa and thermal conductivity of 27-30 mW/m-K.

Fabrication of i) transparent, ii) mechanically robust monoliths by iii) freeze drying can be achieved. Control of the skeletal nanostructure of the aerogels is one factor in producing such materials. Transparency and haze are related to the size of the skeletal aggregates and of the pores in the skeleton of the materials. Roughly, minimizing light scattering requires minimization of the size of the skeletal aggregates, of the pores, and of the pore size distribution. Mechanical reinforcement via polymer cross-linking, however, tends to increase the size of the aggregates. Reinforcing the materials while minimizing the size increase of the skeletal nanoparticles is one way to address the issue. Particular strategies to improve transparency and maintain transparency in freeze-dried, cross-linked aerogels are discussed below.

A. Controlling Morphology and Size of Pores and Aggregates.

Figure 3B:
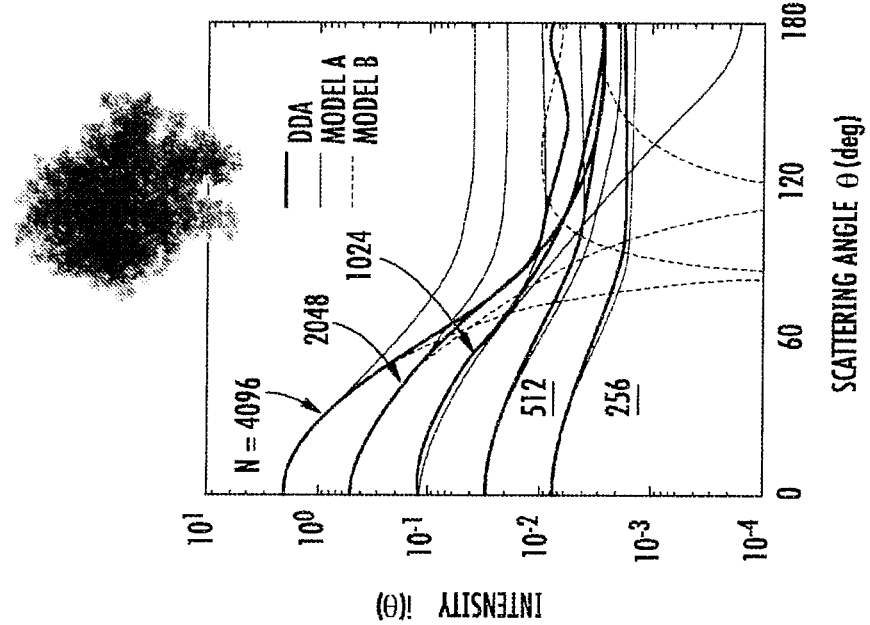
FIGS. 3A and 3B are graphs showing simulations of light scattering from aggregates of silica nanoparticles with different shapes. N indicates the number of silica nanoparticles in the aggregate. Note how the scattering lobe (and thus haze) is wider for the globular aggregate (FIG. 3B) than for the fractal aggregate (FIG. 3A). N indicates the number of nanoparticles in the aggregate. Adapted from T. Kozasa, J. Blum, T. Mukai, "Optical properties of dust aggregates I.", Astron. Astrophys. 263, 423-32 (1992) and T. Kozasa, J. Blum. T. Mukai, "Optical properties of dust aggregates II," Astron. Astrophys. 276, 278-88 (1993).
Figure 3A:
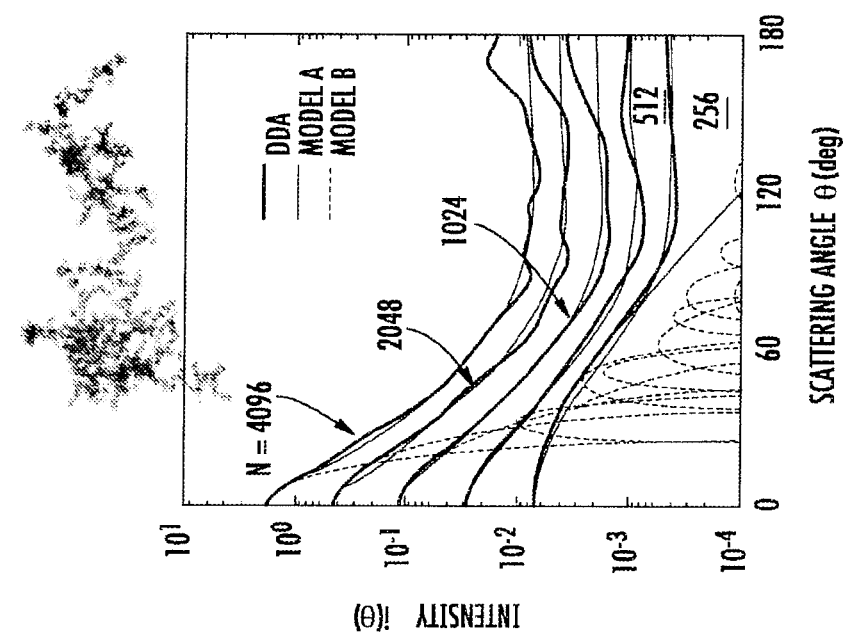

The comparatively poor properties of aerogels are due, for the most part, to light scattering. The microscopic structure of aerogels consists of primary particles with a size <5 nm which aggregate into secondary particles with a size of 20-30 nm. Correspondingly, there are two types of pores in aerogels. Micropores are the pores between primary particles and have a size <10 nm. Mesopores are the pores between the secondary particles and have a size of tens of nanometers. A considerable amount of theoretical and experimental work has shown that light scattering in aerogels depends on size and morphology of all these structures (particles and pores). (See P. B. Wagh, R. Begag, G. M. Pajonk, A. V. Rao, D. Haranatha, "Comparison of some physical properties of silica aerogel monoliths synthesized by different precursors", *Materials Chemistry and Physics* 57 (1999) 214-218; A. Emmerling, R. Petricevic, A. Beck, P. Wang, H. Scheller, J. Fricke, "Relationship between optical transparency and nanostructural features of silica aerogels", *Journal of Non-Crystalline Solids* 185 (1995) 240-248; E. Economopoulos, T. Ioannides, "Synthesis of transparent silica aerogels using tetraalkylammonium fluoride catalysts", *J Sol-Gel Sci Technol* (2009) 49, 347-354; K. Kanamori, M. Aizawa, K. Nakanishi, and T. Hanada, "New Transparent Methylsilsesquioxane Aerogels and Xerogels with Improved Mechanical Properties", *Adv. Mater.* 2007, 19, 1589-1593; and M. Nogami, S. Hotta, K. Kugimiya, H. Matsubara, "Synthesis and characterization of transparent silica-based aerogels using methyltrimethoxysilane precursor", *J Sol-Gel Sci Technol* (2010) 56, 107-113). However, literature reports are fragmented and sometimes contradictory. For example, Nogami et al. showed a strong correlation between transparency and mean pore size, while Economopoulos et al. reported a weak dependence on pore size. Another study showed that aerogels composed of fibril-like, fractal secondary aggregates are more transparent than aerogels composed of globular aggregates (T. M. Tillotson and L. W. Hrubesh, "Transparent ultralow-density silica aerogels prepared by a two-step sol-gel process", *Journal of Non-Crystalline Solids* 145 (1992) 44-50). However, another study reports the opposite, and attributes the difference to larger pore sizes and pore size distributions of fibrillar aggregates compared to globular aggregates (K. Kanamori, M. Aizawa, K. Nakanishi, and T. Hanada, "New Transparent Methylsilsesquioxane Aerogels and Xerogels with Improved Mechanical Properties", *Adv. Mater.* 2007, 19, 1589-1593). The reason for these apparently contradictory results is, likely, the large number of parameters involved in aerogel synthesis. These include type of precursors, type of catalysis (base, acid, or two-step), concentration of catalyst, synthesis temperature, addition of surfactants and pore-directing agents and drying conditions. Many groups have fabricated aerogels with improved transparency, but each of them has worked on a limited subset of parameters. Since the interplay of the synthesis parameters is complicated, it is not surprising that the literature reports are sometimes contradictory. In addition, modeling of light scattering has been often based on simplified assumptions and models (e.g., Rayleigh scattering), which put considerable emphasis on the size of pores and skeletal nanostructure, but not on their shape. Thus, considerable experimental activity has focused on pore size control, while aggregate shape control has been less actively investigated (see P. B. Wagh, R. Begag, G. M. Pajonk, A. V. Rao, D. Haranatha, "Comparison of some physical properties of silica aerogel monoliths synthesized by different precursors", *Materials Chemistry and Physics* 57 (1999) 214-218; and M. Nogami, S. Hotta, K. Kugimiya, H. Matsubara, "Synthesis and characterization of transparent silica-based aerogels using methyltrimethoxysilane precursor", *J Sol-Gel Sci Technol* (2010) 56, 107-113). More sophisticated simulation approaches, such as the discrete dipole approximation (DDA) (often used to simulate light scattering from aerosols, but generally not used for aerogels) (see T. Kozasa, J. Blum, T. Mukai, "Optical properties of dust aggregates I.", *Astron. Astrophys.* 263, 423-32 (1992); and T. Kozasa, J. Blum, T. Mukai, "Optical properties of dust aggregates II.", *Astron. Astrophys.* 276 278-88 (1993)) show that the shape of aggregates plays a very important role. DDA results for aggregates of silica nanoparticles (10 nm radius) with different fractal dimensions are reported in FIGS. 3A and 3B. The simulations show that globular aggregates (right) scatter light at larger angles than aggregates with a lower fractal dimension (left). Thus, aerogels with a fibrillar nanostructure are likely to be less hazy than aerogels with a globular nanostructure, in agreement with results by the Hruhesch group (see T. M. Tillotson and L. W. Hrubesh, "Transparent ultralow-density silica aerogels prepared by a two-step sol-gel process", *Journal of Non-Crystalline Solids* 145 (1992) 44-50) and by the Nakanishi group (see K. Kanamori, M. Aizawa, K. Nakanishi, and T. Hanada, "New Transparent Methylsilsesquioxane Aerogels and Xerogels with Improved Mechanical Properties", *Adv. Mater.* 2007; 19, 1589-1593). Controlling pore size and aggregate morphology appears to be helpful.

Comparing the transparency of aerogels with globular and fibrillar nanostructure is one way to increase understanding of the factors involved in obtaining greater transparency. To obtain a globular nanostructure, wet gels can be synthesized by base catalysis of tetramethylorthosilicate (TMOS). To obtain a fractal, fibrillar-like nanostructure, a two-step catalysis (acid and then base) of tetraethylorthosilicate (TEOS) can be used (see T. M. Tillotson and L. W. Hrubesh, "Transparent ultralow-density silica aerogels prepared by a two-step sol-gel process", *Journal of Non-Crystalline Solids* 145 (1992) 44-50). Based on the results presented in FIGS. 3A and 3B, gels obtained by TEOS are expected to exhibit the lowest haziness. Given the many contradictory literature reports, exploration of both morphologies is warranted. In addition, TMOS is the most widely used precursor for the fabrication of transparent aerogels and its investigation can provide a baseline. The synthesis conditions will be varied to tune the size of the secondary particles. One important parameter appears to be catalyst concentration. Most available evidence (see A. Emmerling, R. Petricevic, A. Beck, P. Wang, H. Scheller, J. Fricke, "Relationship between optical transparency and nanostructural features of silica aerogels", *Journal of Non-Crystalline Solids* 185 (1995) 240-248; A. V. Rao, S. D. Bhagat, "Synthesis and physical properties of TEOS-based silica aerogels prepared by two step (acid-base) sol-gel process", *Solid State Sciences* 6 (2004) 945-952; and E. Economopoulos, T. Ioannides, "Synthesis of transparent silica aerogels using tetraalkylammonium fluoride catalysts", *J Sol-Gel Sci Technol* (2009) 49, 347-354) suggests that high catalyst concentrations favor nucleation over growth, lead to smaller aggregates and increase transparency. A parameter that has been seldom investigated is temperature. Gelation time is usually greatly reduced when the temperature is increased even by a few degrees (see S. Sakka and H. Kozuka, Rheology of sols and fiber drawing", *Journal of non-crystalline solids.* 100, 142-153 (1988)). Rapid gelation will likely inhibit growth of secondary particles and help produce aerogels with the smallest possible secondary aggregates.

Organosilanes may also play a role in obtaining greater transparency. Di- and tri-functional silicon alkoxides such as methyltrimethoxysilane (MTMS) and polyethoxydisiloxane (PEDS) have been shown in some investigations to lead to materials with increased transparency (see K. Kanamori, M. Aizawa, K. Nakanishi, T. Hanada, "Elastic organic-inorganic hybrid aerogels and xerogels", *J Sol-Gel Sci Technol* (2008) 48, 172-181; P. B. Wagh, R. Begag, G. M. Pajonk, A. V. Rao, D. Haranatha, "Comparison of some physical properties of silica aerogel monoliths synthesized by different precursors", *Materials Chemistry and Physics* 57 (1999) 214-218; A. V. Rao, S. D. Bhagat, "Synthesis and physical properties of TEOS-based silica aerogels prepared by two step (acid-base) sol-gel process", *Solid State Sciences* 6 (2004) 945-952; 1. Adachi, T. Sumiyoshi, K. Hayashi, N. Iida, R. Enomoto, K. Tsukada, R. Suda, S. Matsumoto, K. Natori, M. Yokoyama, H. Yokogawa, "Study of a threshold Cherenkov counter based on silica aerogels with low refractive indices", *Nuclear Instruments and Methods in Physics Research A* 355 (1995) 390-398; K. Kanamori, M. Aizawa, K. Nakanishi, and T. Hanada, "New Transparent Methylsilsesquioxane Aerogels and Xerogels with Improved Mechanical Properties", *Adv. Mater.* 2007, 19, 1589-1593; and A. Yu. Barnyakov, M. Yu. Barnyakov, V. V. Barutkin, V. S. Bobrovnikov, A. R. Buzykaev, A. F. Daniluk, S. A. Kononov, V. L. Kirillov, E. A. Kravchenko, A. P. Onuchin, "Influence of water on optical parameters of aerogel", *Nuclear Instruments and, Methods in Physics Research A* 598 (2009) 166-168). However, some authors have also reported that organosilanes degrade the optical properties of aerogels (see N. Husing and U. Schubert, "Organofunctional Silica Aerogels", *Journal of Sol-Gel Science and Technology* 8, 807-812 (1997); and N. Husing, U. Schubert, K. Misof and P. Fratzl, "Formation and Structure of Porous Gel Networks from Si(OMe)$_4$ in the Presence of A(CH2)nSi (OR)$_3$ (A) Functional Group", *Chem. Mater.* 1998, 10, 3024-3032). There are several reasons for this discrepancy. For example the transparency of aerogels synthesized using TEOS, TMOS and PEDS was investigated (see A. V. Rao, S. D. Bhagat, "Synthesis and physical properties of TEOS-based silica aerogels prepared by two step (acid-base) sol-gel process", *Solid State Sciences* 6 (2004) 945-952; and D. Lee, P. C. Stevens, S. Q. Zeng, A. J. Hunt, "Thermal characterization of carbon-opacified silica aerogels", *Journal of Non-Crystalline Solids* 186 (1995) 285-290). The aerogels, however, were prepared using different water and catalyst concentrations for each precursor. PEDS aerogels had the highest catalyst concentration. The high catalyst concentration may explain the higher transparency because of formation of smaller secondary particles. Thus, it is difficult to understand whether the higher transparency of PEDS was due to the catalyst concentration or the precursor. More recent work (see K. Kanamori, M. Aizawa, K. Nakanishi, T. Hanada, "Elastic organic-inorganic hybrid aerogels and xerogels", *J Sol-Gel Sci Technol* (2008) 48, 172-181; and K. Kanamori, M. Aizawa, K. Nakanishi, and T. Hanada, "New Transparent Methylsilsesquioxane Aerogels and Xerogels with Improved Mechanical Properties", *Adv.*

Mater. 2007, 19, 1589-1593) has shown that high transparency can be attained using organosilanes when a surfactant is added to the gelation solution. The surfactant prevents phase separation induced by the hydrophobic organic moiety (methyl) attached to the organosilane. Increased transparency by addition of surfactants is in overall agreement with the trend of other authors such as Husing (see N. Husing and U. Schubert, "Organofunctional Silica Aerogels", *Journal of Sol-Gel Science and Technology* 8, 807-812 (1997); N. Husing, U. Schubert, K. Misof and P. Fratzl, "Formation and Structure of Porous Gel Networks from Si(OMe)4 in the Presence of A(CH2)nSi(OR)3 (A) Functional Group)", *Chem. Mater.* 1998, 10, 3024-3032), where transparency was highest when organosilanes were employed which carried hydrophilic moieties. Combination of surfactants and organosilanes appears the most promising strategy to limit the size of skeletal secondary aggregates and improve transparency. Surfactants are a standard way of limiting nanoparticle growth, while the organic moiety carried by organosilanes inhibits condensation and helps prevent growth of secondary particles. (see P. B. Wagh, R. Begag, G. M. Pajonk, A. V. Rao, D. Haranatha, "Comparison of some physical properties of silica aerogel monoliths synthesized by different precursors", *Materials Chemistry and Physics* 57 (1999) 214-218; I. Adachi, T. Sumiyoshi, K. Hayashi, N. Iida, R. Enomoto, K. Tsukada, R. Suda, S. Matsumoto, K. Natori, M. Yokoyama, H. Yokogawa, "Study of a threshold Cherenkov counter based on silica aerogels with low refractive indices", *Nuclear Instruments and Methods in Physics Research A* 355 (1995) 390-398; I. Adachi, T. Sumiyoshi, K. Hayashi, N. Iida, R. Enomoto, K. Tsukada, R. Suda, S. Matsumoto, K. Natori, M. Yokoyama, H. Yokogawa, "Study of a threshold Cherenkov counter based on silica aerogels with low refractive indices". *Nuclear Instruments and Methods in Physics Research A* 355 (1995) 390-398). Systematic investigation of organosilanes and extension to alkoxides carrying vinyl-, acrylic- and styrene-groups is important and necessary. These alkoxides have long chains that may further reduce particle growth and increase hydrophobicity. The role played by organosilanes should be clarified to attain optimal transparency, but also because they are relevant to cross-linking and freeze drying. Cross-linking typically employs derivatization of the pores using an organosilane carrying a polymerizable moiety. Organosilanes increase the flexibility of the aerogel skeleton (see K. Kanamori, M. Aizawa, K. Nakanishi, T. Hanada, "Elastic organic-inorganic hybrid aerogels and xerogels", *J Sol-Gel Sci Technol* (2008) 48, 172-181; and K. Kanamori, M. Aizawa, K. Nakanishi, and T. Hanada, "New Transparent Methylsilsesquioxane Aerogels and Xerogels with Improved Mechanical Properties", *Adv. Mater.* 2007, 19, 1589-1593), which is beneficial for freeze drying. The derivatizing moiety can be introduced by exchanging the gelation solvent with a solution of the desired trifunctional alkoxide. However, processing steps could be saved by performing synthesis and derivatization in the same step. Organosilane precursors can also be used alone or in combination with TEOS, TMOS and other alkoxides.

In addition to controlling the skeletal morphology and size, light transmission can be improved by precise control of pore size and pore size distribution. This can be achieved to a high degree by using surfactants and drying control chemical additives (DCCA). By varying DCCA (e.g., glycerol) and/or surfactant concentration, materials with tunable pore sizes and extremely narrow pore size distributions can be obtained, which, in turn, have high transparency (see D. Haranath, A. V. Rao, and P. B. Wagh, "Influence of DCCAs on Optical Transmittance and Porosity Properties of TMOS Silica Aerogels", *Journal of Porous Materials* 6, 55-62 (1999); A. V. Rao, M. M. Kulkarni, "Effect of glycerol additive on physical properties of hydrophobic silica aerogels", *Materials Chemistry and Physics* 77 (2002) 819-825; K. Kanamori, M. Aizawa, K. Nakanishi, and T. Hanada, "New Transparent Methylsilsesquioxane Aerogels and Xerogels with Improved Mechanical Properties", *Adv. Mater.* 2007, 19, 1589-1593; and M. Nogami, S. Hotta, K. Kugimiya, H. Matsubara, "Synthesis and characterization of transparent silica-based aerogels using methyltrimeihoxysilane precursor", *J Sol-Gel Sci Technol* (2010) 56, 107-113). Narrow pore size distributions also help the freeze drying effort by leading to uniform freezing temperatures throughout the monolith and minimizing solvent diffusion and mechanical stresses, as discussed below in Section C.

Samples can be characterized with optical methods, but also and with scanning electron microscopy (SEM) and small-angle X-ray scattering (SAXS) (two alternative and complementary methods for structural investigation of the nanostructure of aerogels), and solid-state nuclear magnetic resonance (NMR) spectroscopy.

B. Transparent Cross-Linked Aerogels.

Figure 4:
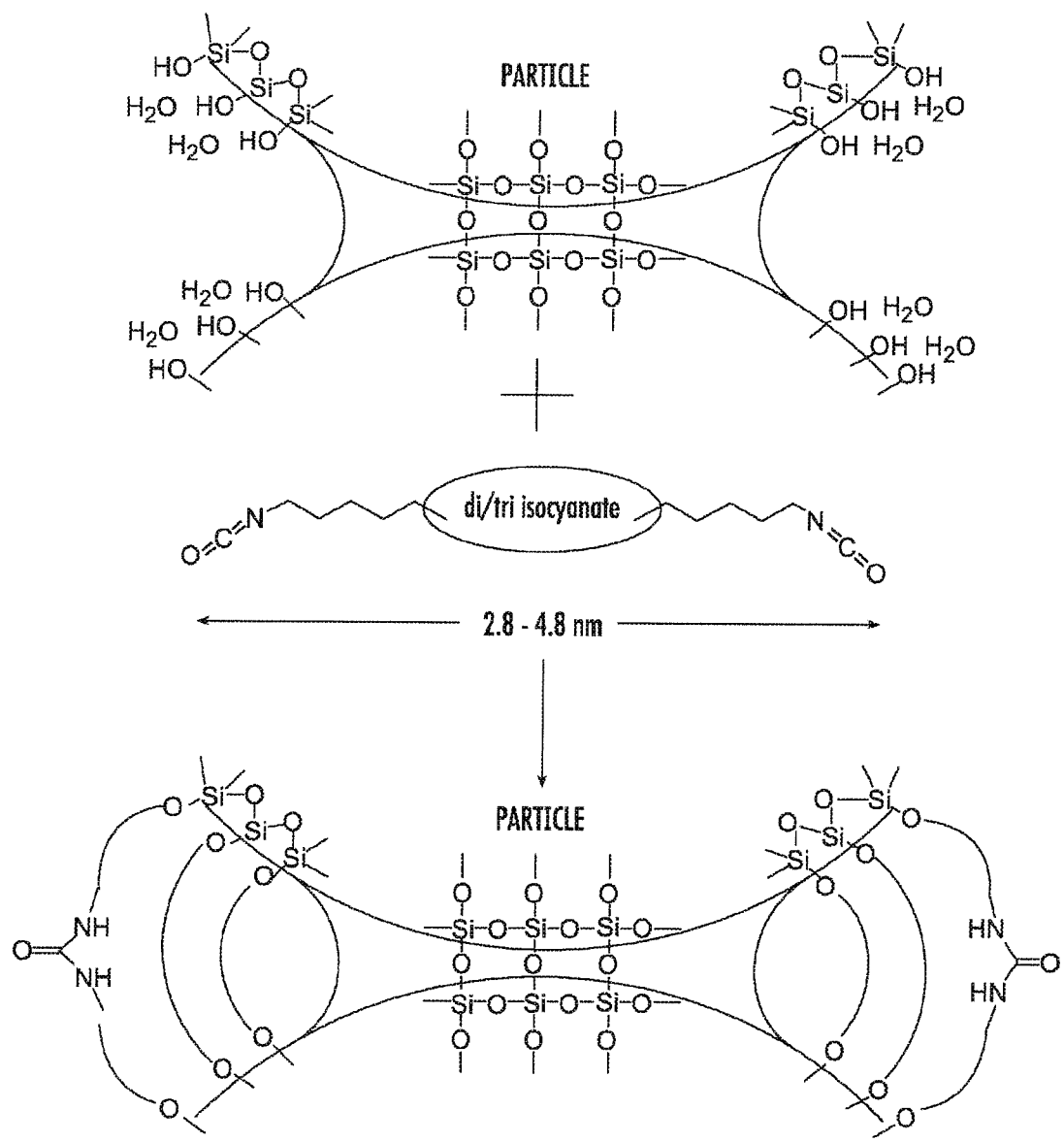
FIG. 4 is a diagram showing an example of cross-linking of silica aerogels. The gelation solution contains a monomer which engages the moiety at the surface of silica nanoparticles when polymerization is initiated.

For cross-linked aerogels, transparency has been seldom reported, and this is related to the cross-linking polymer and to the polymerization kinetics. As shown in FIG. 4, the cross-linking polymer attaches to the surface of the primary particles and yields a conformal coating of the oxide skeleton. It reinforces the aerogels but it also increases the size (and thus the scattering) of the skeletal aggregates. Thus, cross-linked aerogels are typically opaque.

Figure 5:
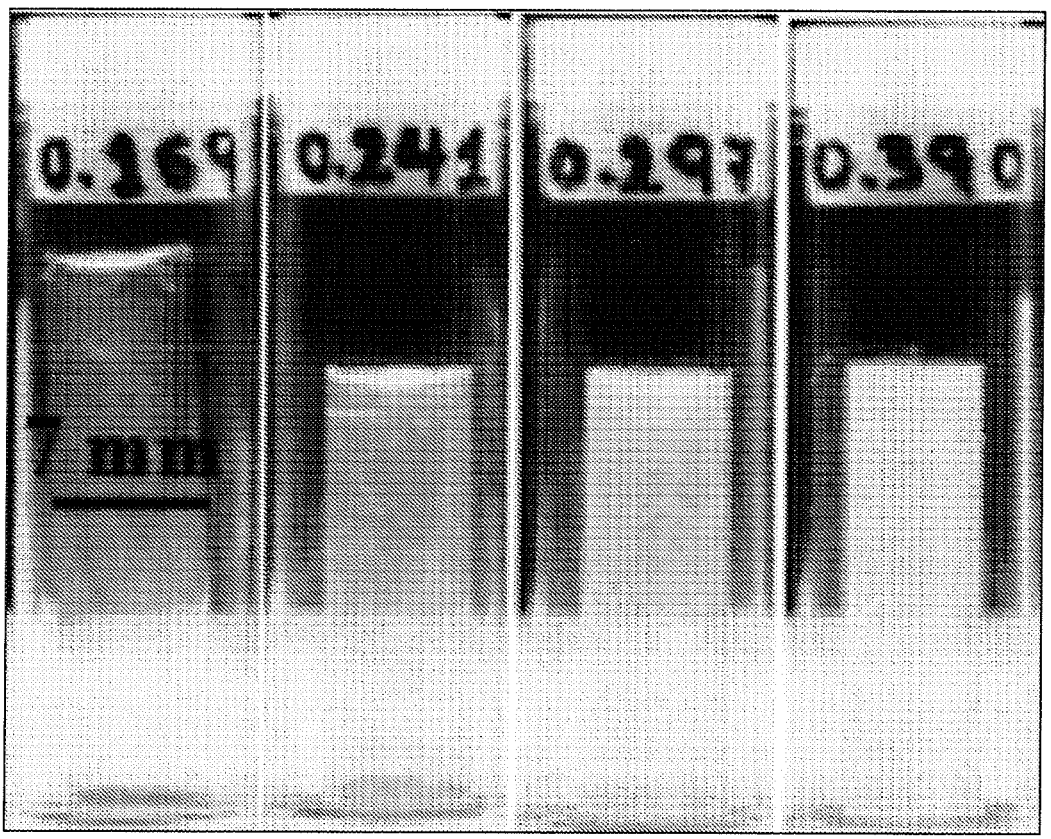
FIG. 5 is an image of a series of aerogels cross-linked with polyurethane at a temperature of 100° C. The cross-linker concentration increases from left (native aerogels) to right, and the transparency of the materials with the lowest cross-linker concentration resembles that of native aerogels. All samples had a diameter of 7 mm. Adapted from N. Leventis, C. Sotiriou-Leventis, G. Zhang, and A.-M. M. Rawashdeh *Nano Letters,* 2002, 2 (9). pp 957-960.

FIGS. 2A, 2B, and 5, however, show that adequate choice of cross-linker (polyurethane) and processing conditions (high temperatures) yields transparent materials. A key for transparency is increasing the rate of the polymerization reaction to reduce the size of the polymer aggregates. Increased polymerization rates can be readily achieved with urethanes. To cross-link with urethanes, the gelation solution is typically exchanged with a solution of acetone and an isocyanate. The gel is then heated to about 60° C. (in a closed vessel to prevent solvent evaporation) to initiate polymerization (see M. A. B. Meador, L. A. Capadona, L. McCorkle, D. S. Papadopoulos, and N. Leventis, "Structure-Property Relationships in Porous 3D Nanostructures as a Function of Preparation Conditions: Isocyanate Cross-Linked Silica Aerogels", *Chem. Mater.* 2007, 19, 2247-2260). The polymerization temperature is determined by the low boiling temperature of the solvent (acetone). When a solvent with a higher boiling point (e.g., propylene carbonate) is used, one can work at higher temperatures. Higher temperatures accelerate the polymerization reaction and limit the size of polymer aggregates. For example, the transparent samples shown in FIGS. 2A, 2B, and 5 were synthesized at 100° C. Likely, higher temperatures could further improve transparency.

Transparency could be further increased in two ways. Reducing the concentration of monomer in the gelation solution appears to be safest and most immediate solution. The sample with best transparency (second left, top panel, FIG. 5) had also the lowest concentration of cross-linker. Yet, its mechanical properties were quite reasonable: the modulus was ~15 MPa and the stress at break was ~1 MPa (see N. Leventis, C. Sotiriou-Leventis, G. Zhang, and A.-M. M. Rawashdeh *Nano Letters,* 2002, 2 (9), 957-960; M. A. B. Meador, L. A. Capadona, L. McCorkle, D. S. Papadopoulos, and N. Leventis, "Structure-Property Relationships in Porous 3D Nanostructures as a Function of Preparation Conditions: Isocyanate Cross-Linked Silica Aerogels", *Chem. Mater.* 2007, 19, 2247-2260; G. Zhang, A. Dass. A.-M. M. Rawashdeh, J. Thomas, J. A. Counsil, C. Sotiriou-Leventis. E. F. Fabrizio. F. Ilhan. P. Vassilaras, D. A. Scheiman, L. McCorkle, A. Palczer, J. C. Johnston. M. A. Meador, N. Leventis, "Isocyanate-crosslinked silica aerogel monoliths: preparation and characterization". *Journal of Non-Crystalline Solids* 350 (2004) 152-164; and L. S. White. M. F. Bertino, S. Saeed, K. Saoud, "Influence of silica derivatizer and monomer functionality and concentration on the mechanical properties of rapid synthesis cross-linked aerogels", *Microporous and Mesoporous Materials,* 217, 244-252 (2015)). An alternative way of decreasing monomer concentration is use of polyfunctional monomers (e.g., di-isocyanates and tri-isocyanates). In recent work, the present inventors showed that polyfunctional cross-linkers yielded materials with high modulus even at low concentration. The reason is probably formation of highly cross-linked, rigid polymer networks (see L. S. White. M. F. Bertino, S. Saeed. K. Saoud, "Influence of silica derivatizer and monomer functionality and concentration on the mechanical properties of rapid synthesis cross-linked aerogels", *Microporous and Mesoporous Materials,* 217, 244-252 (2015)).

Figure 6A:
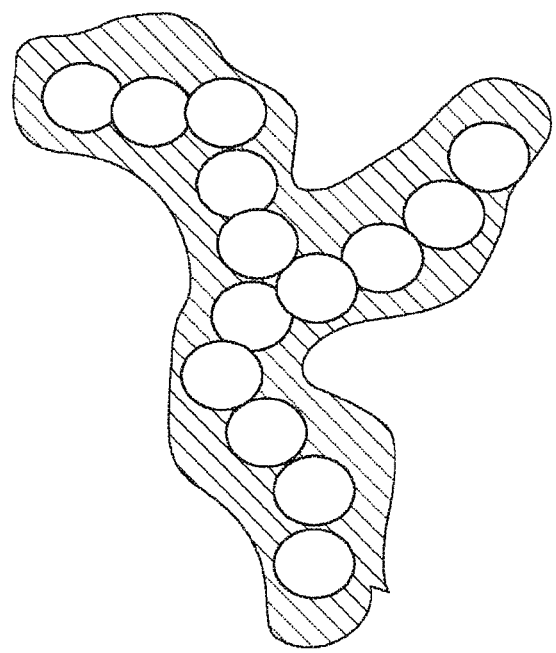
FIGS. 6A and 6B are schematic diagrams showing the effect of conformal coating (orange) on different skeletal morphologies (white) with FIG. 6A showing a fibrillar skeletal morphology. The conformal coating increases aggregate size by approximately twice the coating's thickness.
Figure 6B:
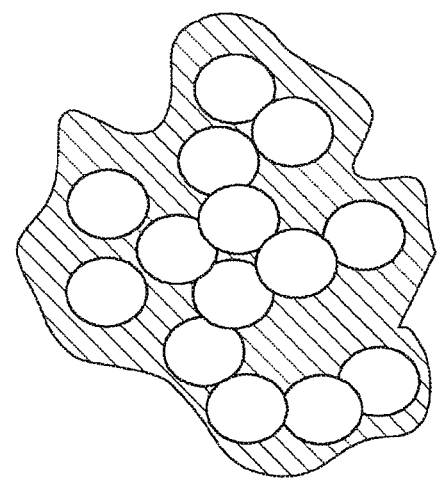

Another way of increasing transparency is to use materials with a fibrillar instead of a globular skeletal structure. As the inventors show in FIGS. 6A and 6B, the cross-linking polymer builds a conformal coating of the oxide structure. If the starting structure is fibrillar as in FIG. 6A, the coating increases the diameter of the fibrils but it does not bridge between them. However, if the starting structure is more globular (FIG. 6B), the polymer can bridge between adjacent branches. The result provides an aggregate which is larger than the starting structure, and scattering is increased. The native and the cross-linked samples reported in FIGS. 2A, 2B, and 5 can further be optimized for transparency, where light transmission was of about 65% in the sample of FIGS. 2A and 2B (which was optimized for strength, contained about 50% of polymer by weight and had a modulus of about 100 MPa), and of about 75% in the sample of FIG. 5 (which had a modulus of 15 MPa).

C. Fabrication of Transparent aerogels/monoliths by Freeze Drying.

Figure 7:
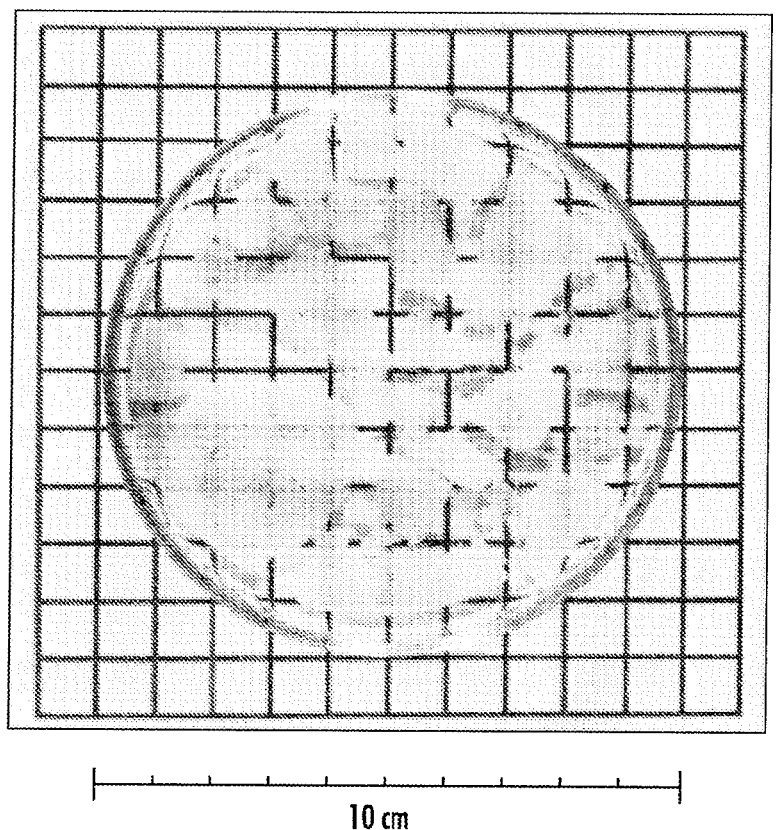
FIG. 7 is an image of a transparent aerogel produced by freeze drying. The aerogel had been strengthened by prolonged aging, and a DCCA was used to control pore size distribution. Adapted from E. Degn Egeberg, J. Engell, "Freeze drying of silica gels prepared from siliciumethoxid", *Journal de Physique Colloques,* 1989, 50 (C4), p.C4-23-C4-28.

The results reported in FIGS. 1A-1D show that aerogel monoliths can be produced by freeze drying. The fabrication of monoliths is typically limited by the size of the freeze dryer. Fabrication of aerogel panes with a minimum size of 15×15 cm and a thickness of up to 25 mm are possible with appropriately sized freeze dryers. This size is the minimum necessary to measure thermal conductivity with ASTM C518, which is the most common thermal test for insulation. Aerogels according to the invention can be prepared with thicknesses ranging from 1 mm to 50 mm, for example, such as from 2-40 mm, or from 3-30 mm, or from 4-25 mm, or from 5-45 mm, or from 8-20 mm, such as from 15-28 mm, or from 18-32 mm, or from 9-24 mm, or from 12-26 mm, and so on. Up-sizing to tens of cm needs to address stresses within the solid skeleton of porous materials induced by the freezing process. The stresses are caused by growth of large crystals inside pores and solvent diffusion between pores. Because of the larger surface-to-volume ratio, the solvent in small pores freezes at a lower temperature than the solvent in large pores. These different freezing temperatures cause diffusion of solvent from the small to the large pores during freezing (see G. W. Scherer, "Freezing gels", *Journal of Non-Crystalline Solids* 155 (1993) 1-25). Solvent depletion generates capillary stresses and cracking inside the small pores. Solvent diffusion also supports growth of crystals inside the large pores. These crystals tend to grow even after they become as large as the pores and induce cracking. To minimize freezing stresses, solvents with a low entropy of fusion can be employed, such as cyclohexane and tert-butanol (t-butanol). For example, t-butanol was employed for the fabrication of the sample in FIG. 1A. Cross-linking has been realized as one way to strengthen the aerogels and prevent fragmentation. This indicates that considerable stresses arise within the monolith, even though t-butanol is being employed. Cross-linking likely allows up-scalable fabrication of monoliths. The critical part size (i.e., the largest size that can be dried without fragmentation) that can be fabricated by freeze drying depends on the modulus of the material. Aerogels, produced in the past by freeze drying (see E. Degn Egeberg, J. Engell, "Freeze drying of silica gels prepared from siliciumethoxid", *Journal de Physique Colloques,* 1989, 50 (C4), p.C4-23-C4-28) had a modulus <0.1 MPa and a critical part size of 3-5 mm, see also FIG. 7. Cross-linked aerogels, have a modulus of up to 100 times the modulus of native aerogels (see N. Leventis, C. Sotiriou-Leventis, G. Zhang, and A.-M. M. Rawashdeh *Nano Letters,* 2002, 2 (9), pp 957-960). Materials having a critical part size of between 30 and 50 cm can be produced using the methods described herein.

In addition to cross-linking, strategies to reduce stresses and increase transparency should also be considered. One is refining the synthetic procedure. The sample of FIG. 2A the gelation solution contained synthesis byproducts, such as water and methanol. These solvents are detrimental to freeze drying (see E. Degn Egeberg, J. Engell, "Freeze drying of silica gels prepared from siliciumethoxid", *Journal de Physique Colloques,* 1989, 50 (C4), p.C4-23-C4-28). Removal of these solvents by solvent exchange after gelation yields aerogels with improved light transmission (FIG. 2B). Solvent exchange is not expected to represent a processing bottleneck, since window panes are thin (<¼ inch), thus solvent exchanges can be completed in a few hours.

A second strategy is use of urethane cross-linkers instead of the acrylics used in FIGS. 1A-1D. As shown in FIGS. 2A and 2B, urethane is a cross-linker that yields the strongest, yet transparent materials. Acrylics tend to yield opaque materials with a lower modulus than urethane cross-linkers (see L. S. White, M. F. Bertino, S. Saeed, K. Saoud, "Influence of silica derivatizer and monomer functionality and concentration on the mechanical properties of rapid synthesis cross-linked aerogels", *Microporous and Mesoporous Materials,* 217, 244-252 (2015)). An additional way of reducing freezing stresses is to synthesize materials with a narrow pore size distribution. Because of the narrow pore size distribution, the solvent in the pores will freeze at nearly the same temperature, solvent diffusion will be minimized and so will the stresses. The efforts to improve transparency by narrowing pore size distribution described above in Section A can also greatly aid freeze drying. Early work to fabricate translucent monoliths by freeze drying has been performed (see E. Degn Egeberg, J. Engell, "Freeze drying of silica gels prepared from siliciumethoxid", *Journal de Physique Colloques,* 1989, 50 (C4), p.C4-23-C4-28). In this work, translucent aerogels granules (7-8 mm in size) were obtained by using a DCCA to control pore size distribution, see FIG. 7. The gels were aged for a long time (>7 days) to strengthen their structure, and were exchanged several times with t-butanol to remove by-products and solvents from the original gelation solution. In more recent work (see L. F. Su, L. Miao, S. Tanemura and G. Xu, "Low-cost and fast synthesis of nanoporous silica cryogels for thermal insulation applications", *Sci. Technol. Adv. Mater.* 13 (2012) 035003; and A. Pons, L. Casas, E. Estop, E. Molins, K. D. M. Harris, M. Xu, "A new route to aerogels: Monolithic silica cryogels", *Journal of Non-Crystalline Solids* 358 (2012) 461-469) opaque granules and monoliths were obtained, likely because of use of t-butanol containing some moisture. In the study by Egeberg, (see E. Degn Egeberg, J. Engell, "Freeze drying of silica gels prepared from siliciumethoxid", *Journal de Physique Colloques,* 1989, 50 (C4), p.C4-23-C4-28), provides that t-butanol must be dry, or else it expands when frozen. Solvent expansion enlarges and cracks pores, increasing scattering.

Figure 8A:
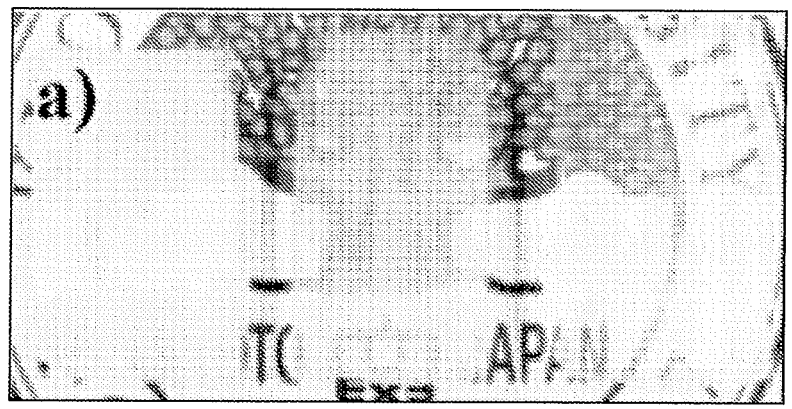
FIGS. 8A-8C are images of flexible aerogels with FIG. 8A showing the transparency of different formulations and FIG. 8B showing demonstration of stress recovery. Adapted from K. Kanamori, M. Aizawa, K. Nakanishi, and T. Hanada, "New Transparent Methylsilsesquioxane Aerogels and Xerogels with Improved Mechanical Properties", *Adv. Mater.* 2007. 19, 1589-1593.
Figure 8B:
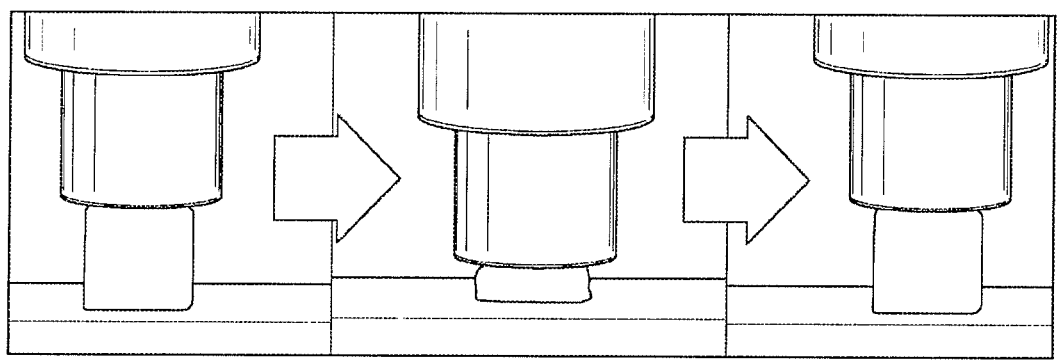
Figure 8C:
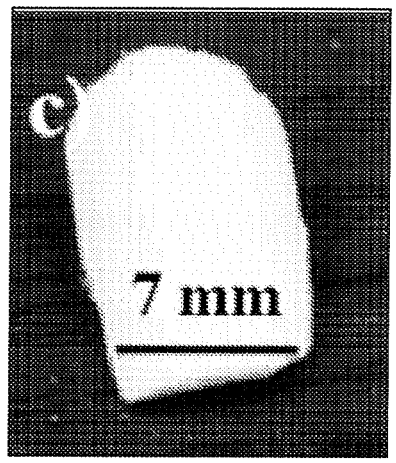

Yet another alternative strategy can minimize freezing stresses and this is synthesis of flexible monoliths. Flexible aerogels can be produced by careful tuning of density and concentration of cross-linking agent (see L. A. Capadona, M. A. B. Meador, A. Alunni, E. F. Fabrizio, P. Vassilaras, N. Leventis, "Flexible, low-density polymer crosslinked silica aerogels", Polymer 47 (2006) 5754-5761), by using a flexible cross-linker (see H. Guo, B. N. Nguyen, L. S. McCorkle, B. Shonkwiler and M. A. B. Meador, "Elastic low density aerogels derived from bis [3-(triethoxysilyl) propyl]disulfide, tetramethylorthosilicate and vinyltrimethoxysilane via a two-step process", *J. Mater. Chem.,* 2009, 19, 9054-9062), or by coating the oxide surfaces with methyl groups which repel each other and prevent compression-induced sintering of oxide nanoparticles (see K. Kanamori, M. Aizawa, K. Nakanishi, T. Hanada, "Elastic organic-inorganic hybrid aerogels and xcrogels", *J Sol-Gel Sci Technol* (2008) 48, 172-181; K. Kanamori, M. Aizawa, K. Nakanishi, and T. Hanada, "New Transparent Methylsilsesquioxane Aerogels and Xerogels with Improved Mechanical Properties", *Adv. Mater.* 2007, 19, 1589-1593 A. V. Rao, S. D. Bhagat, H. Hirashima, G. M. Pajonk, "Synthesis of flexible silica aerogels using methyltrimethoxysilane (MTMS) precursor", *Journal of Colloid and Interlace Science* (2006) 300, 279-285). Flexible aerogels can be synthesized which are highly transparent (see K. Kanamori, M. Aizawa, K. Nakanishi, T. Hanada, "Elastic organic-inorganic hybrid aerogels and xerogels", *J Sol-Gel Sci Technol* (2008) 48, 172-181; K. Kanamori, M. Aizawa, K. Nakanishi, and T. Hanada, "New Transparent Methylsilsesquioxane Aerogels and Xerogels with Improved Mechanical Properties", *Adv. Mater.* 2007, 19, 1589-1593) and can recover from a linear strain as large as 80%, as shown in FIGS. 8A-8C. Flexible aerogels are promising for freeze drying, since their flexible structure could accommodate freezing stresses. Preliminary results, reported in FIG. 8C), show that flexible aerogels can be freeze dried without the need for mechanical reinforcement. The dried aerogel was opaque, likely because of residual water. The synthetic procedure reported previously (see K. Kanamori, M. Aizawa, K. Nakanishi, T. Hanada, "Elastic organic-inorganic hybrid aerogels and xerogels", *J Sol-Gel Sci Technol* (2008) 48, 172-181) uses a high water concentration (50% by volume) in the gelation solution. Repeated washings with t-butanol are necessary to remove the water. The test sample of FIG. 8C was washed twice in a 10× excess t-butanol, which was likely not sufficient to remove all the water. T-butanol expanded during freezing and yielded an opaque material. More experimentation is being carried out to determine the pore size distribution of the wet and dry gels and to determine the optimum number of washings.

There is an additional alternative to improve transparency, and this is heat treatment. Heat treatment reduces the mean pore size and pore size distribution and leads to transparent monoliths. For example, the groups of Rao and Pajonk found that transparency of native aerogels increases by heating to about 400° C., and then decreases with increasing temperature (see P. B. Wagh, G. M. Pajonk, D. Haranath, A. V. Rao, "Influence of temperature on the physical properties of citric acid catalyzed TEOS silica aerogels", *Materials Chemistry and Physics* 50 (1997) 76-81). Transparency increases again when the sintering temperature of aerogels is reached (~1000° C.). The increase in transparency for mild heat treatment (<400° C.) is explained by desorption of synthesis leftovers (see A. Yu. Barnyakov, M. Yu. Barnyakov, V. V. Barutkin, V. S. Bobrovnikov, A. R. Buzykaev, A. F. Daniluk, S. A. Kononov, V. L. Kirillov, E. A. Kravchenko, A. P. Onuchin, "Influence of water on optical parameters of aerogel", *Nuclear Instruments and Methods in Physics Research A* 598 (2009) 166-168), but also by a mild narrowing of the pore size distribution. This result is in agreement with more recent work. Aerogels processed at 450° C., for example, were used in one of the most successful aerogel window projects funded by the European Union (see K. I. Jensen, F. H. Kristiansen and J. M. Schultz, Public Final Report, Contract Number ENK6-CT-2002-00648, "Highly insulating and light transmitting aerogel glazing for super insulating windows", November 2005). When aerogels are processed at temperatures >400° C., sineresis occurs, which leads to larger pores and higher scattering. Transparency is recovered only at temperatures close to the sintering temperature, when the aerogel completely loses its porosity. In the inventors' case, mild heat treatment could also be used to remove (partially or totally) the cross-linking polymer, and thus further increase transparency, as shown in FIG. 1C).

Optimum thermal conductivity is also important to minimize thickness, costs and light scattering. Hydrophobicity is important to prevent moisture penetration, and ultraviolet resistance must be ensured to prevent degradation of the materials. All these properties can be tweaked as appropriate.

Figure 9:
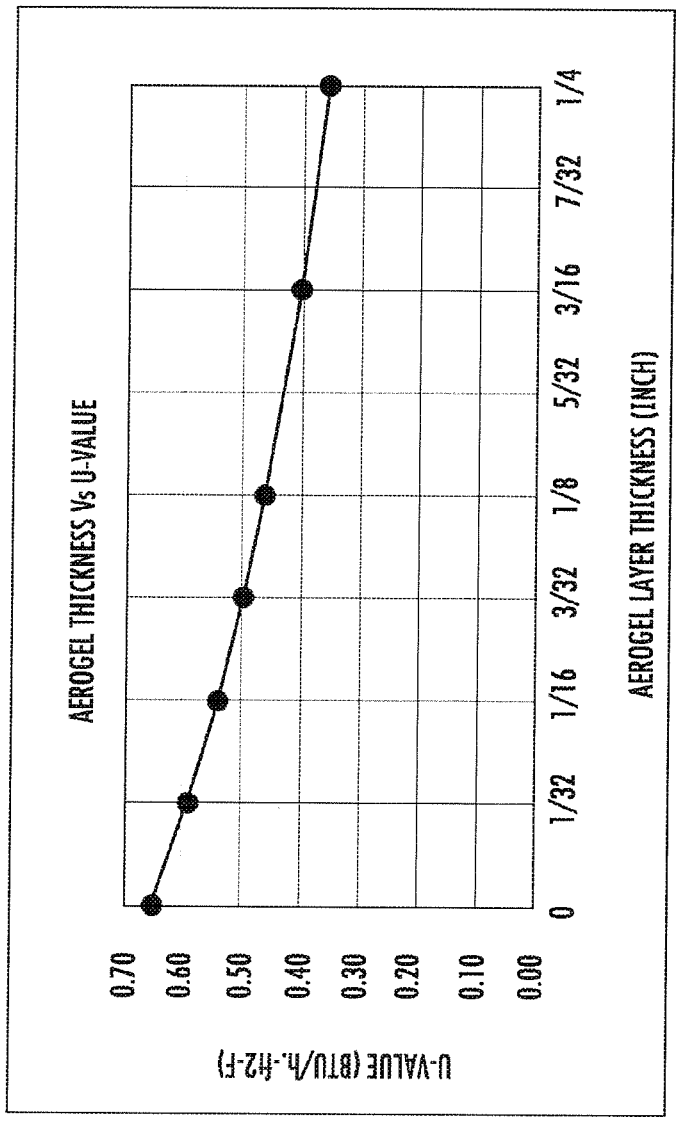
FIG. 9 is a graph showing simulation of the U value of a glass pane coated with a coating of emissivity 0.1, attached to an aerogel pane with thermal conductivity of 30 mW/m-K. The total thickness of the retrofit is kept to ¼ inch.

Thermal conductivity is usually between 15 and 20 mW/m-K for native aerogels, around 30 mW/m-K for aerogels with a polymer content <20% by weight, and of about 50 mW/m-K for aerogels with a polymer content >50% by weight (see L. S. White, D. R. Echard, M. F. Bertino. X. Gao, S. Donthula, N. Leventis, N. Shukla, J. Kośny, S. Saeed and K. Saoud, "Fabrication of native silica, cross-linked, and hybrid aerogel monoliths with customized geometries", *Transl. Mater. Res.* 3 (2016); and N. Leventis, "Three-Dimensional Core-Shell Superstructures: Mechanically Strong Aerogels", *Acc. Chem. Res.,* 2007, 40, pp 874-884). The calculations shown in FIG. 9 show that the U-values and composite thicknesses can be attained with a thermal conductivity of 30 mw/m-K (20% by weight max. of cross-linker, see also FIG. 5). Thermal conductivity could be lowered by another ~20% by opacification (see J. Fricke. X. Lu, P. Wang. D. Buttner and U. Heinemann. "Optimization of monolithic silica aerogel insulants", *J. Heat Mass Transfer.* 35, 2305-2309 (1992); D. Lee, P. C. Stevens, S. Q. Zeng, A. J. Hunt, "Thermal characterization of carbon-opacified silica aerogels", *Journal of Non-Crystalline Solids* 186 (1995) 285-290; T.-Y. Wei, S.-Y. Lu, and Y.-C. Chang. "A New Class of Opacified Monolithic Aerogels of Ultralow High-Temperature Thermal Conductivities", *J. Phys. Chem. C* 2009, 113, 7424 7428). For example, opacification can be carried out using $TiO_2$ (see J. Wang, J. Kuhn. X. Lu, "Monolithic silica aerogel insulation doped with $TiO_2$ powder and ceramic fibers", *Journal of Non-Crystalline Solids* 186 (1995) 296-300), which is transparent. For $TiO_2$ opacification, pre-synthesized nanoparticles can be added to the gelation solution, or a Ti alkoxide can be added directly to the gelation solution or via solvent exchange. The amount of opacifier can be kept around 5% by weight to prevent phase separation, a common occurrence especially when nanoparticles are added to the solution (see J. Fricke. X. Lu, P. Wang. D. Buttner and U. Heinemann, "Optimization of monolithic silica aerogel insulants", *J. Heat Mass Transfer,* 35, 2305-2309 (1992); J. Kuhn, T. Gleissner, M. C. Arduini-Schuster, S. Korder, J. Fricke, "Integration of mineral powders into $SiO_2$ aerogels). A preferred thermal conductivity is 30 mW/m-K without opacification, and ~25 mW/m-K with opacification.

Hydrophobicity. As discussed in this Example, the most promising fabrication pathway for the inventive composites is use of methyltrimethoxysilane (MTMS) as a precursor, surfactants to prevent phase separation and for pore size control, and cross-linking using isocyanates. This combination of precursors and cross-linkers can impart mechanical strength (from the cross-linker), flexibility (because of the derivatization of the nanoparticles with an organic group), and also hydrophobicity (via the methyl group of MTMS). If other alternatives prove more feasible or yield better results, hydrophobicity could be introduced by exchanging the gelation solution with a solution of MTMS, or by adding a hydrophobic monomer to the cross-linking isocyanate. For example, one could prepare a cross-linking solution of di-isocyanate, of a multifunctional isocyanate carrying an acrylic moiety, and of a highly hydrophobic monomer such as 2,3,4,5-pentafluorostyerene. All these monomers are commercially available and commonly used in industry, and they have been used in the past to fabricate hydrophobic aerogels (see U. F. Ilhan, E. F. Fabrizio, L. McCorkle, D. A. Scheiman, A. Dass, A. Palczer, M. A. B. Meador, J. C. Johnston and N. Leventis, "Hydrophobic monolithic aerogels by nanocasting polystyrene on amine-modified silica", *J. Mater. Chem.,* 2006, 16. 3046-3054).

Aging. Materials can be subjected to cycles of elevated temperature, moisture and UV radiation to test for aging. Among these parameters, it is expected that UV exposure will be the most critical. Silica, cross-linkers and hydrophobic derivatizers are not strongly affected by high temperatures. Moisture is likely not an issue, as long as the materials remain hydrophobic. UV light, instead, can degrade the organic components of the materials. To prevent UV degradation, the most practical way appears to be addition of a $TiO^2$ coating. $TiO^2$ is transparent in the visible, is a good UV absorber and it would also contribute to opacification. Composites can be analyzed with standard analytical techniques (absorption spectroscopy, FT-IR, NMR, SEM, etc.) during the aging testing to determine the causes of deterioration and tweak the synthesis correspondingly.

D. Integration of Aerogel Panes into Products.

Panel produced by using the inventive techniques are likely good candidates for both Category 1 and Category 2 products. For a Category 1 product a U-value <0.5 BTU/sf/hr/° F., a light transmittance >70% and a thickness of <⅛ inch are required. In embodiments, the aerogels can have a light transmittance ranging from 10% up to 100%, such as from 15% to 90%, or from 20% to 95%, or from 25% to 80%, or from 30% to 85%, or from 40% to 75%, or from 60% to 78%, or from 70% to 98%, and so on. The simulations reported in FTG. 9 show that the required U-value can be attained by an aerogel pane with a thickness of 3/32 inch and a thermal conductivity of 30 mW/m-K. The required thermal conductivity is well within the range of those of cross-linked aerogels, so it is expected that such panels can also have the required U-value with a thickness below ⅛ inch. As for light transmittance, typical light transmittance reported in the literature for optimized aerogels is of 80% for a standard sample thickness of 10 mm (0.394 inch) (see K. Kanamori, M. Aizawa, K. Nakanishi, T. Hanada, "Elastic organic-inorganic hybrid aerogels and xerogels", *J Sol-Gel Sci Technol* (2008) 48, 172-181; and K. Kanamori, M. Aizawa, K. Nakanishi, and T. Hanada, "New Transparent Methylsilsesquioxane Aerogels and Xerogels with Improved Mechanical Properties", *Adv. Mater.* 2007, 19, 1589-1593). Category 1 products, however, require panes ⅛ inch thick. The reduced thickness relaxes the requirements on light transmission. Using Beer-Lambert's law, a sample 10 mm thick with a transmittance of 30% will have a transmittance of 80% when thinned down to ⅛ inch (approx. 3.55 mm). This transmittance of 30% (at 10 mm thickness) was achieved by the cross-linked samples of FIG. 5, which were not optimized for optical transparency. Thus, it appears that cross-linked aerogels can be used as Category 1 products with minimal optimization. These materials are mechanically strong (10-100 MPa in modulus), can be glued without shearing (see L. S. White, D. R. Echard, M. F. Bertino, X. Gao, S. Donthula, N. Leventis, N. Shukla, J. Kośny, S. Saeed and K. Saoud, "Fabrication of native silica, cross-linked, and hybrid aerogel monoliths with customized geometries", *Transl. Mater. Res.* 3 (2016)) and would only need a polycarbonate sheet (1/32 inch thick) on the exterior surface for scratch protection and a low-e coating (0.1) to improve thermal insulation.

For a Category 2 product, a U-value of <0.40 BTU/sf/hr/° F., a light transmittance >80% and a thickness <¼ inch are required. The required U-value would require a minimum pane thickness of 5/32 inch for a thermal conductivity of 30 mW/m-K, see FIG. 9. Using Beer-Lambert's law, a light transmittance of 80% for a 5/32 inch thick panel is equivalent to a light transmittance of 57% for a pane thickness of 10 mm. This light transmittance is easily achieved by aerogels. The panes would be sandwiched between glass panes, 3/64 inch thick to increase mechanical strength. This configuration is particularly attractive for mechanically weak aerogels. The sandwich structure would require use of tempered glass to make composite as strong as a conventional glass pane. Tempered glass, in fact, has an ultimate strength ~8 times higher than that of soda lime glass. For integration with Category 1 and 2 products, techniques to minimize scattering and reflection at the interfaces should be employed, including determining optimum adhesives, and optimizing low-e coatings. Seal edge and desiccant technology is also a consideration to be integrated to fabricate a full-scale pane laminate.

EXAMPLE 3

Translucent and transparent aerogels can also be fabricated from compositions disclosed by the Group of N. Leventis in *Chem. Mater.* 2006, 18, 285-296. In brief, gels can be fabricated using 3-aminopropyltriethoxysilane (APTES) and tetramethylorthosilicate as silica precursors. It is believed that APTES serves as derivalizer for the pore walls and a catalyst for the gelation reaction.

Samples can be prepared for example using 0.350 ml TMOS, 0.067 ml APTES, 0.626 ml Acetonitrile. and 0.105 ml $H_2O$. After gelation, the sample can be placed in a leak-tight container filled with excess acetonitrile at a 5:1 ratio and set in an oven for four hours at 70° C. The acetonitrile can then be exchanged for fresh acetonitrile at a 5:1 ratio, and then again after 3 hours. The solvent can then be exchanged with a solution of an isocyanate (such as di-isocyanate or tri-isocyanate) in acetonitrile. A typical solution comprises 0.560 g di-isocyanate in 10 ml acetonitrile, however, other proportions are also possible. After an exchange for 24 hours, the sample can be placed in a 5:1 excess acetonitrile and placed in an oven at 70° C. for 24 hours. During this time, the sample is cross-linked with di-isocyanate. After cross-linking with di-isocyanate is complete, the pore-filling acetonitrile solution can be exchanged with tert-butanol or another freeze-dryable solvent. The samples are typically exchanged with a 5:1 wash of tert-butanol three times, with the first exchange taking two hours and the remaining washes three hours. Besides t-butanol, typical solvents used in freeze drying are cyclohexane or dimethylsulfoxide (DMSO). These solvents are popular because they freeze near room temperature. Other solvents such as ethanol can be theoretically employed. However, most organic solvents require freezing to very low temperatures, which makes their use more impractical. It is preferred that the solvent used for freeze drying be kept "dry" (as free of water as possible (such as <1% by volume or better)). However, use of solvents that form a eutectic or a glassy phase with water, such as for example DMSO, could be potentially employed.

Samples exhibiting a preferred level of transparency or translucency can be obtained according to this procedure, which allows for very rapid gelation. Rapid gelation minimizes the size of light-scattering aggregates and improves transparency. Rapid gelation can also be attained by gelation at high temperatures, and/or by using excesses of acid or base catalysts, and/or by using di-isocyanates. Another preferred technique includes aging the sample for a minimum of four hours before cross-linking in an oven kept at 70° C., which is believed to reinforce the skeleton of the aerogel to withstand freezing stresses. Additionally, it has been found that samples that are frozen slowly have lower transparency than samples frozen quickly (for example, by using higher freezing temperatures). Higher transparency samples are possible when freezing is performed in a manner to avoid the solvent from forming large crystals. Similarly, large samples tend to present a transparent outer layer and a translucent or opaque core, due to differences in freezing velocity at the surface and core. Samples can be frozen by placing them in refrigerators, but are best refrigerated by placing them into a pre-cooled liquid, such as water-antifreeze mixtures, or organic solvents such as methanol. The higher density of the liquid (compared to air in a freezer) ensures more rapid cooling. Best results are obtained when the temperature of the whole sample is brought below the freezing point of the sample in less than 4 minutes, but other velocities are possible.

Figure 10A:
FIGS. 10A-B are photographs of aerogel samples prepared according to embodiments described in this disclosure.
Figure 10B:
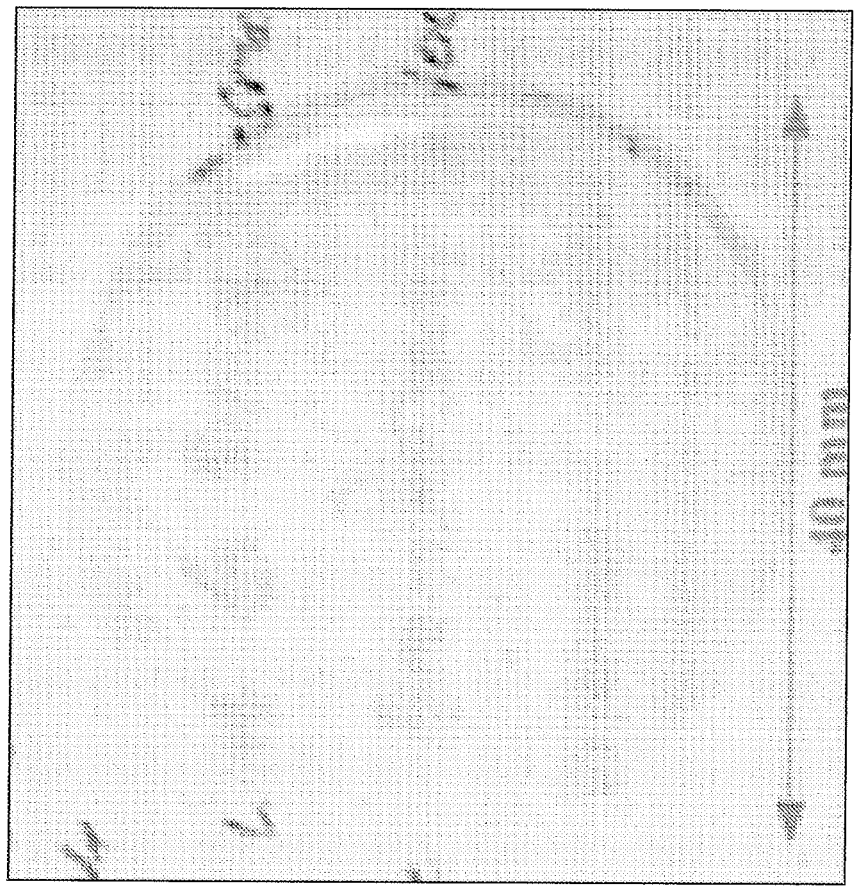

Using the preferred techniques, transparent aerogels result, as shown in FIGS. 10A-B. A transparent sample with a thickness of 6 mm is shown in FIG. 10A. A translucent 3 mm disk prepared without an oven aging step is shown in FIG. 10B. The samples have a density of 0.457 grams per cubic centimeter, a surface area of about 350 $m^2/g$ and a mean pore radius of 5 nm. For comparison, more opaque (but still translucent) aerogels prepared according to other methods can result in samples having a density of 0.457 grams per cubic centimeter, a surface area between 200 and 250 $m^2/g$, and a mean pore size of about 5 nm, with the lower surface area indicative of formation of light-scattering macropores in the opaque materials.

Figure 11A:
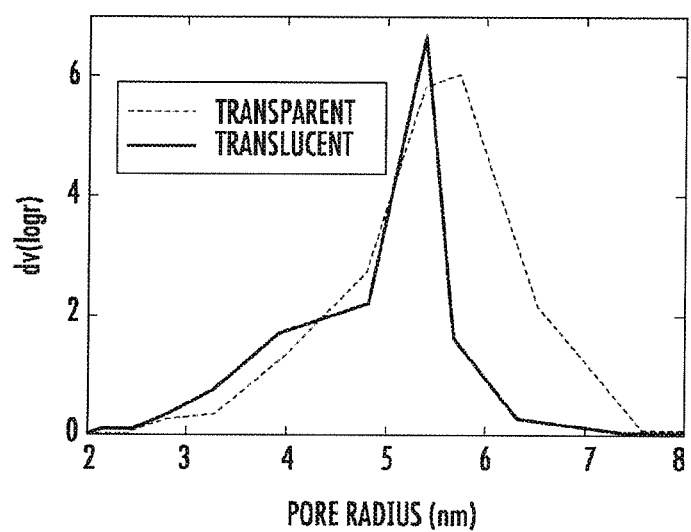
FIG. 11A-B are graphs showing pore size distributions calculated using the BJH approximation (FIG. 11A) and providing an adsorption isotherm of transparent and translucent regions of the same sample (FIG. 11B), where the translucent region was in the core and had been frozen more slowly than the outer regions.
Figure 11B:
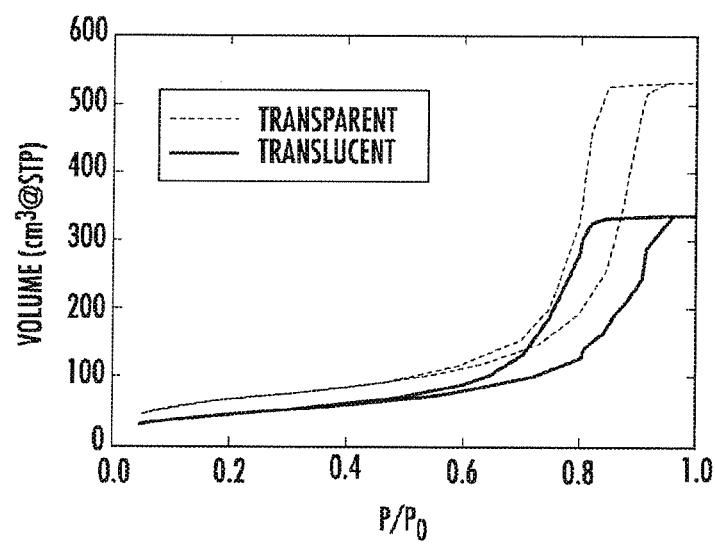

Adsorption isotherms for transparent and more cloudy materials are of type IV, as shown in FIGS. 11A-B. In particular, pore size distributions shown are calculated using the BJH approximation (FIG. 11A) and an adsorption isotherm of transparent and translucent regions of the same sample is shown (FIG. 11B), where the translucent region was in the core and had been frozen more slowly than the outer regions. These results indicate that the materials were mostly mesoporous. Macropores in translucent samples were not prevalent, but must have been present in sufficient density to compromise the optical properties of the materials.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A method for producing an aerogel, comprising:
   combining a silicon alkoxide or an alkoxide of other transition metals, an acrylate or acrylated monomer and/or an di-isocyanate or tri-isocyanate monomer, a silica derivatizer for derivatizing the resulting pores, the silica derivatizer being an organosilane carrying a polymerizable moiety, a polymerization initiator, being a thermal initiator or a photoinitiator, a solvent, and a catalyst, the catalyst being an acid, a base or a catalyst containing fluoride, as a composition;
   pouring the composition into a mold;
   allowing the composition to form a wet gel by way of hydrolysis of the alkoxide and condensation of the hydrolyzed alkoxide, the gelation being catalysed by the catalyst;
   removing solvents from the wet gel; then
   exposing the wet gel to a light or heat stimulus with sufficient intensity to catalyze cross-linking of the wet gel by the polymerization initiator; and
   freeze drying the cross-linked wet gel to form an aerogel, wherein said removing solvent steps increases transparency of the aerogel compared to process where removing solvents is not performed.

2. The method of claim 1, wherein the removing step is performed such that the solvent comprises less than 5% v/v water based on volume of the solvent.

3. The method of claim 1, wherein the alkoxide is provided in a first precursor solution, and the acrylate or acrylated monomer and/or an di-isocyanate or tri-isocyanate monomer, the catalyst, the silica derivatizer and the polymerization initiator are provided in a second precursor solution, and the first precursor solution and the second precursor solution are combined to form the composition.

4. The method of claim 3 wherein composition includes tert butanol as a solvent.

5. The method of claim 1, wherein the composition comprises a primary, secondary, or tertiary alcohol or mixture thereof as a solvent.

6. The method of claim 5, wherein the solvent is one or more solvent having a low entropy of fusion, or cyclohexane, or tert-butanol (t-butanol), a mixture of organic solvent and water, organic solvent, alcohol, ketone, ethanol, methanol, butanol, propanol, acetone, acetonitrile, or dimethylsulfoxide.

7. The method of claim 1, wherein the alkoxide is one or more of tetraethyl orthosilicate (TEOS), tetramethyl orthosilicate (TMOS), polyethoxydisiloxane (PEDS), methyltrimethoxysilane (MTMS), or vinyltrimethoxysilane (VMOS).

8. The method of claim 1 wherein the monomer is an acrylated monomer selected from the group consisting of hexanediol diacrylate, acrylated dipentaerythritol, methyl acrylate, ethyl acrylate, 2-chloroethyl vinyl ether, 2-ethylhexyl acrylate, hydroxyethyl methacrylate, butyl acrylate, and butyl methacrylate.

9. The method of claim 1 wherein the polymerization initiator is a thermal initiator and the stimulus is heat.

10. The method of claim 1 wherein the polymerization initiator is a photoinitiator and the stimulus is light.

11. The method of claim 10 wherein the light is visible light sourced from an array of light-emitting diodes.

12. The method of claim 11 wherein the visible light is provided at an intensity of at least 30 mW cm.

13. The method of claim 1 wherein the silica derivatizer is trimethoxysilylpropyl methacrylate.

14. The method of claim 1 wherein the freeze-drying step is performed at a temperature and under conditions sufficient to bring the temperature of the wet gel in its entirety to below the freezing point of the wet gel in less than 4 minutes.

15. The method of claim 1 further comprising heating the aerogel to increase its transparency compared to the aerogel without a post heat treatment.

16. The method of claim 15 wherein the heating is performed such that the aerogel is subjected to a temperature of greater than 400° C.

17. The method of claim 1 further comprising subjecting the aerogel to uniaxial compression.

18. The method of claim 1 wherein the aerogel is from 1 mm to 50 mm thick and has a light transmittance of at least 50%.

19. The method of claim 1 wherein the aerogel is from 1 mm to 50 mm thick and has a light transmittance of at least 90%.

* * * * *